US012147656B1

(12) United States Patent
Apoorva et al.

(10) Patent No.: US 12,147,656 B1
(45) Date of Patent: Nov. 19, 2024

(54) GRAPHICAL USER INTERFACES AND TECHNIQUES FOR GENERATING DIGITAL SPIROGRAPHS

(71) Applicant: Adobe Inc., San Jose, CA (US)

(72) Inventors: Apoorva, Noida (IN); Ishita Menon, Mumbai (IN); Deep Sinha, Ghaziabad (IN); Ayush Bansal, Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/337,947

(22) Filed: Jun. 20, 2023

(51) Int. Cl.
| | |
|---|---|
| *G06F 3/04845* | (2022.01) |
| *G06T 7/20* | (2017.01) |
| *G06T 7/64* | (2017.01) |
| *G06T 11/20* | (2006.01) |

(52) U.S. Cl.
CPC ............ *G06F 3/04845* (2013.01); *G06T 7/20* (2013.01); *G06T 7/64* (2017.01); *G06T 11/203* (2013.01); *G06T 2200/24* (2013.01)

(58) Field of Classification Search
CPC ......... G06F 3/04845; G06T 7/20; G06T 7/64; G06T 11/203; G06T 2200/24
See application file for complete search history.

(56) References Cited

U.S. PATENT DOCUMENTS 11,915,349 B1 * 2/2024 Nandakumar ............ G06T 7/64

OTHER PUBLICATIONS

Dominic Ford, Spirograph pattern generator, 2021 based on availability on world wide web, https://sciencedemos.org.uk/spirograph.php (Year: 2021).*
Wikipedia, Mathematical Basis of Spirograph, https://en.wikipedia.org/wiki/Spirograph, (Year: 2005).*
Dominic Ford, "Spirograph pattern generator," ScienceDemos.org.uk, Dec. 16, 2022, webpage <https://sciencedemos.org.uk/spirograph.php>.

* cited by examiner

*Primary Examiner* — Douglas M Wilson
(74) *Attorney, Agent, or Firm* — Keller Preece PLLC

(57) ABSTRACT

This disclosure describes one or more implementations of systems, non-transitory computer-readable media, and methods that utilize a drawing application technique that enables a simulation of digital spirograph designs within electronic drawing applications. In some embodiments, the disclosed systems receive a user selection of a primary shape. Moreover, in one or more implementations, the disclosed systems detect a user interaction with a contact point within a secondary shape to move the contact point from a first location to a second location. Furthermore, in one or more instances, the disclosed systems generate, for display, a digital line drawing from the first location to the second location utilizing a movement of the contact point in relation to a rotation of a secondary curve of the secondary shape along a movement path corresponding to a primary curve of the primary shape based on the user interaction with the contact point.

20 Claims, 20 Drawing Sheets

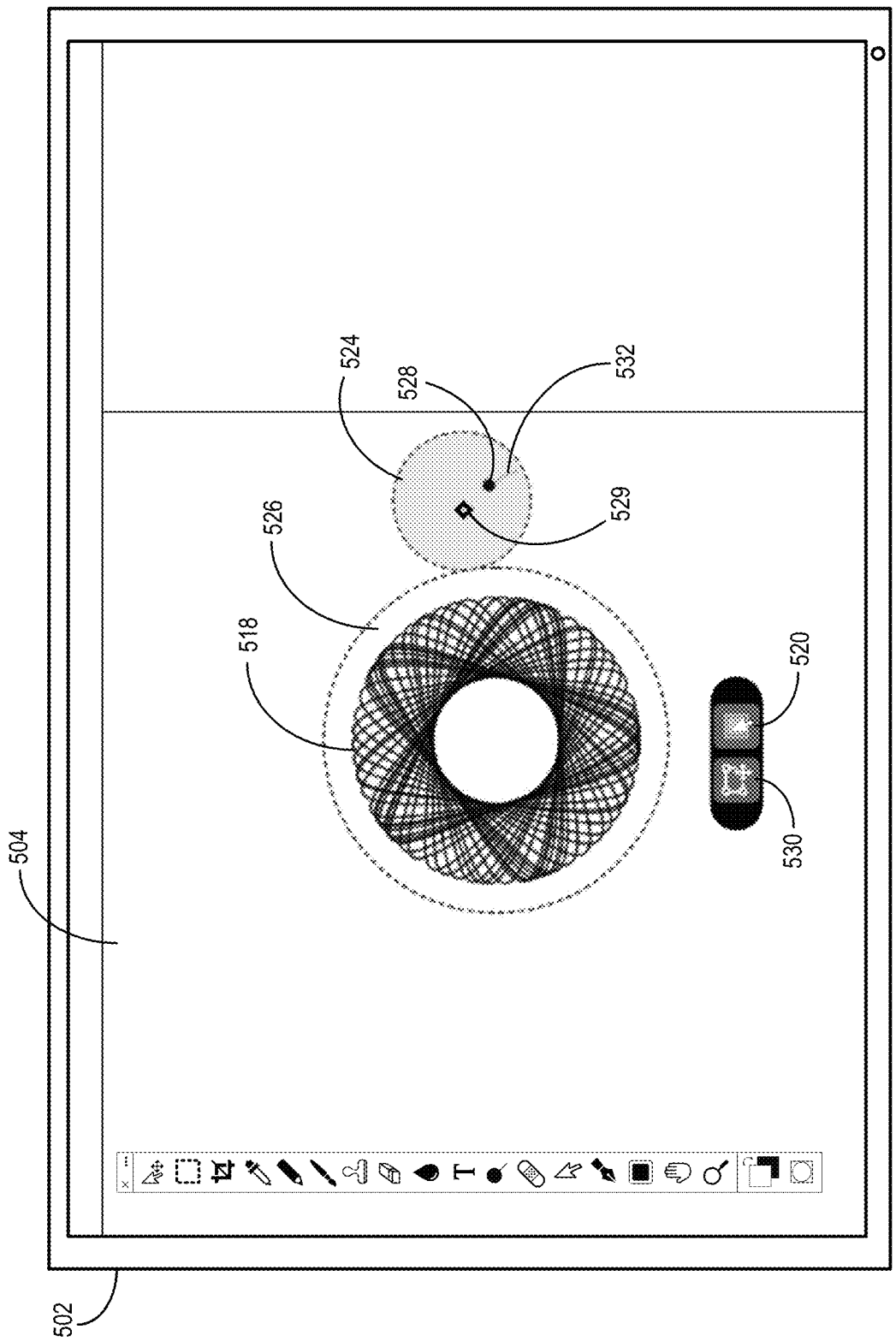

GRAPHICAL USER INTERFACES AND TECHNIQUES FOR GENERATING DIGITAL SPIROGRAPHS

BACKGROUND

Recent years have seen an increase in the creation and modification of digital content. For example, individuals and business increasingly utilize computing devices to create and modify digital content, such as digital images and digital drawings. In many instances, digital content designers utilize drawing applications to create and modify patterns in digital images and digital drawings.

SUMMARY

This disclosure describes one or more implementations of systems, non-transitory computer readable media, and methods that solve one or more of the following problems by utilizing a lightweight drawing application technique that enables an accurate simulation of digital spirograph designs within electronic drawing applications with robust modification options for the generated digital spirograph designs. In one or more embodiments, the disclosed systems continuously update a position of a contact point in response to a user interaction moving the contact point within a drawing application to simulate an animation of drawing a spirograph. In particular, in one or more implementations, the disclosed systems continuously project a position of a contact point (that generates a digital line drawing) within a moving shape utilizing a rotation of a moving curve of the moving shape along a virtual curve path created from a primary curve to simulate an animated drawing of a spirograph. Furthermore, in one or more embodiments, the disclosed systems enable various modification options to the spirograph design created using the projected contact point along the moving shape.

BRIEF DESCRIPTION OF THE DRAWINGS

The detailed description is described with reference to the accompanying drawings in which:

FIGS. 5A-5D illustrate a digital geometric drawing system enabling a user interaction to simulate an electronic drawing of a digital spirograph with modification options in accordance with one or more implementations.

DETAILED DESCRIPTION

Figure 1:
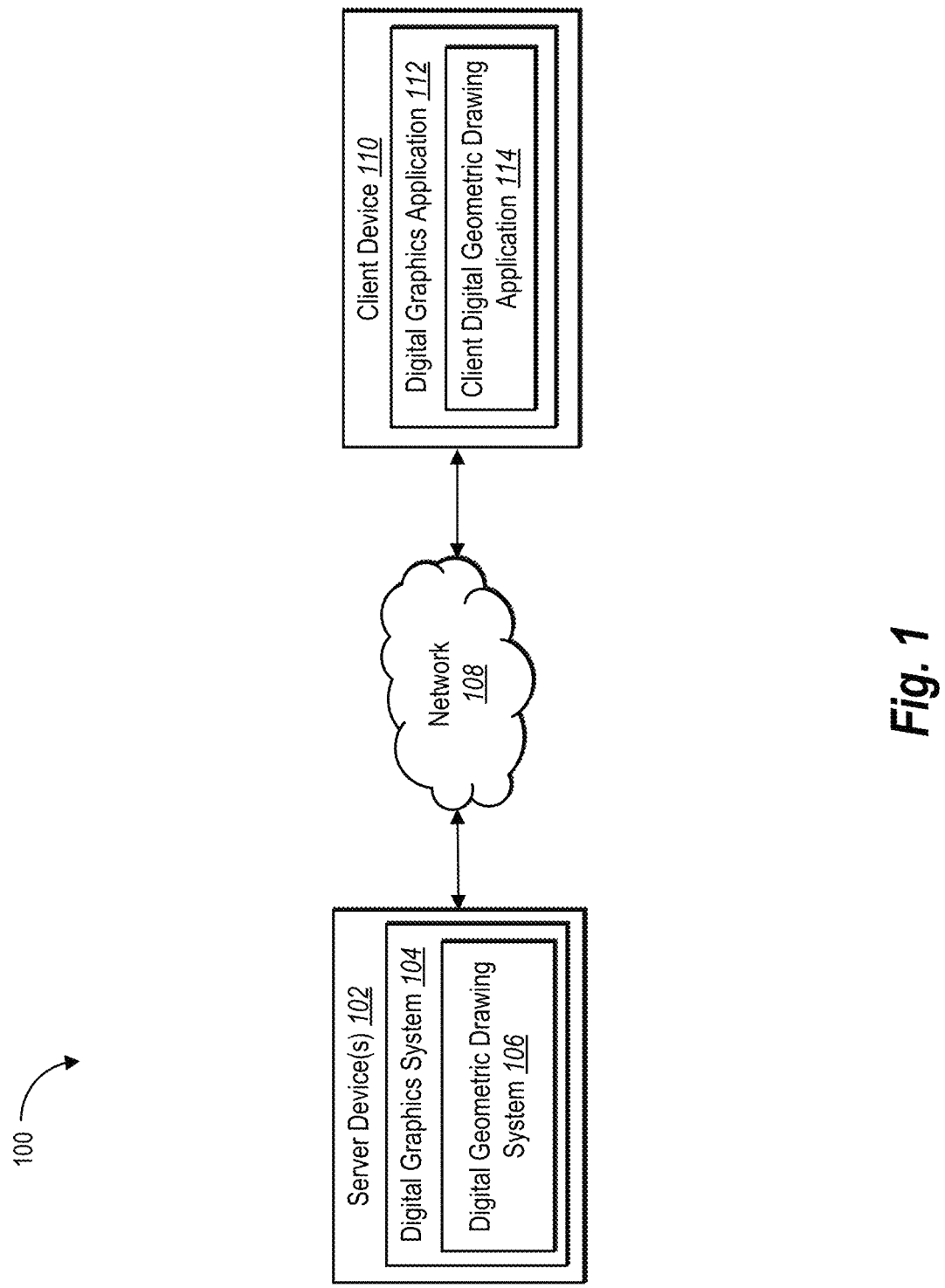
FIG. 1 illustrates a schematic diagram of an example environment in which a digital geometric drawing system operates in accordance with one or more implementations.

This disclosure describes one or more implementations of a digital geometric drawing system that enables an accurate simulation of digital spirograph designs within electronic drawing applications with robust modification options for the generated digital spirograph designs.

Digital content designers often use many conventional digital drawing systems in an attempt to create geometric drawings that resemble spirographs (e.g., hypotrochoids and/or epitrochoids). Indeed, although many conventional digital drawing systems are able to create geometric drawings, many of these conventional digital drawing systems have a number of shortcomings, particularly with regards to accurately, efficiently, and flexibly providing tools to simulate spirograph designs in digital drawing applications.

For instance, in many cases, conventional digital drawing systems do not include tools to simulate a drawing of a spirograph. Rather, oftentimes, digital content creators utilize basic shapes in conventional digital drawing systems to repetitively copy, transform, and paste basic shapes in different orientations to create inaccurate and inefficient digital spirographs. This approach often results in layers of hundreds of basic shapes that become increasingly difficult to manage and increasingly difficult to replicate. Furthermore, such approaches in conventional digital drawing systems are inefficient time wise (e.g., inefficiently require multiple steps to transform hundreds or thousands of shapes to replicate a spirograph design) and also inefficient computationally (e.g., inefficiently require memory and processing to manage the hundreds or thousands of layers created by the shapes).

In addition to being inefficient, many conventional digital drawing systems are unable to accurately replicate (or simulate) spirograph designs such that the spirograph designs look realistic. Oftentimes, conventional digital drawing systems utilize approaches, such as layering multiple shapes (as described above) and/or radial symmetry artwork to draw spirographs. However, these approaches often result in unrealistic (and inaccurate) spirographs designs.

Moreover, many conventional digital drawing systems offer rigid spirograph design creations. For instance, utilizing multi-shape layering results in content that is rigid and difficult to modify. For example, in many conventional digital drawing systems, generated spirographs are difficult to modify because the modifications would require changes to hundreds or thousands of layers of shapes. In some cases, conventional digital drawing systems provide online tools that generate a finalized spirograph design. However, these conventional online tools often are inflexible and provide a finalized spirograph design that is difficult to modify and difficult to customize from the onset. Indeed, oftentimes conventional digital tools require importing of spirograph designs created on separate conventional online tools (with limited customization). Additionally, many conventional digital tools are limited to creating circular spirograph designs within conventional online tools. Accordingly, many conventional digital drawing systems are unable to accurately, efficiently, and flexibly provide tools to simulate spirograph designs in digital drawing applications.

In contrast to such conventional digital drawing systems, the digital geometric drawing system enables an accurate simulation of digital spirograph designs within electronic drawing applications with robust modification options for the generated digital spirograph designs. In one or more embodiments, the digital geometric drawing system identifies a primary shape and a secondary shape within a graphical user interface of a digital drawing application. Then, upon receiving (or detecting) a user interaction moving a contact point placed inside the secondary shape from one location to another location, the digital geometric drawing system, in one or more cases, continuously updates a position of the contact point to simulate an animation of drawing a spirograph. For instance, in one or more implementations, the digital geometric drawing system continuously projects a position of the contact point (that generates a digital line drawing) within the secondary shape while the secondary shape rotates along a virtual curve path created from the primary curve to simulate an animated drawing of a spirograph.

In particular, in one or more embodiments, the digital geometric drawing system detects a user interaction to move a contact point from a first location to a second location within a secondary shape in relation to a primary shape. Subsequently, in one or more implementations, the digital geometric drawing system generates a digital line drawing from the first location to the second location using a movement of the contact point as the contact point moves with a rotation a secondary curve of the secondary shape along a movement path created from a primary curve of the primary shape. In one or more embodiments, the digital geometric drawing system uses a movement path determined from the primary shape and updates a position of the secondary shape along the movement path while also updating a rotation angle of the secondary shape when a user interaction moves the contact point within the secondary shape. In turn, in one or more embodiments, the digital geometric drawing system also updates the position of the contact point to follow the rotational movement of the secondary shape (e.g., as a digital stencil). In one or more implementations, the digital geometric drawing system generates a digital line drawing along the movement of the contact point to simulate the drawing of a spirograph within a graphical user interface of a drawing application.

Furthermore, in one or more embodiments, the digital geometric drawing system utilizes various shapes and sizes for the primary and secondary shapes to generate line drawings for varying spirograph designs. For instance, the digital geometric drawing system provides, within a graphical user interface of a drawing application, one or more selectable options to resize the primary shape and/or secondary shape to change a movement path and/or rotation of the secondary shape (e.g., to cause variation in digital line drawings created from movement of the contact point). In addition, in one or more embodiments, the digital geometric drawing system provides, within a graphical user interface of a drawing application, one or more selectable options to select a primary shape (e.g., a circle, a square, a rectangle, an ellipse, a diamond) to change a movement path (e.g., the shape of the movement path) and/or rotation of the secondary shape (e.g., to cause variation in digital line drawings created from movement of the contact point). Additionally, in some cases, the digital geometric drawing system enables the utilization of various drawing formats (e.g., an electronic pencil tool, an electronic brush tool, an electronic pen tool, an electronic spray paint tool) within a simulated spirograph drawing.

Additionally, in one or more implementations, the digital geometric drawing system enables various modification options for line drawing-based digital spirographs. For example, the digital geometric drawing system receives user interactions, within a graphical user interface, to perform various transformations on a line drawing-based digital spirograph. In addition, in one or more embodiments, the digital geometric drawing system enables user interactions to move and/or transfer line drawing-based digital spirographs within digital files, applications, and/or digital graphics projects (e.g., as a layer and/or texture).

The digital geometric drawing system provides a number of advantages relative to conventional digital drawing systems. For example, unlike conventional digital drawing systems that include an inefficient number of steps to create content that mimics spirograph designs, the digital geometric drawing system provides an intuitive and fast tool to simulate a drawing of a spirograph design with a reduced number of steps. For instance, unlike conventional digital drawing systems that require multiple layers of basic shapes duplicated in different orientations to simulate a spirograph design, the digital geometric drawing system 106 utilizes a lightweight technique using projection of a contact point with a rotational movement of a shape along another shape to generate a digital line drawing that intuitively and natively creates an animated simulation of spirograph design while receiving real time (or near-real time) user interactions from a user (e.g., electronic brush strokes). Indeed, the digital geometric drawing system efficiently enables a selection of shapes, drawing tool types, and movement of an electronic drawing tool (e.g., a cursor, stylus interaction) to create a spirograph drawing natively in a drawing application. This often results in less navigational steps to generate a spirograph design in comparison to conventional digital drawing systems that utilize duplication of multiple layers of transformed shapes and/or importing a pre-existing spirograph design from an inflexible generator tool.

Furthermore, in contrast to the unrealistic spirograph designs of many conventional digital drawing systems, the digital geometric drawing system generates digital line drawings that realistically simulate a spirograph drawing using an approach that determines a position of a contact point (for a digital drawing tool) using rotational movement of a shape within a shape. In particular, in one or more embodiments, the digital geometric drawing system utilizes a selection of shapes, drawing tool types, and movement of an electronic drawing tool (e.g., a cursor, stylus interaction) to create various shapes and sizes of spirographs that mimic natural spirograph designs.

Additionally, the efficient and accurate approach of the digital geometric drawing system also improves the flexibility of a drawing application. To illustrate, the digital geometric drawing system creates a lightweight technique that is implementable on various digital drawing applications. Furthermore, unlike many conventional digital drawing systems that utilize many layers of shapes (or imported spirograph designs), the digital geometric drawing system easily modifies appearances, sizes, shapes, and/or positions of spirograph designs by simply modifying digital line drawings used by a native drawing application during the creation of the spirograph design and by varying the shapes selected for creation of the digital line drawing. In addition, in one or more implementations, the digital geometric drawing system generates digital line drawings that replicate spirographs that easily export to other files and/or applications (with modifiable capabilities intact).

Turning now to the figures, FIG. 1 illustrates a schematic diagram of one or more implementations of a system 100 (or environment) in which a digital geometric drawing system operates in accordance with one or more implementations. As illustrated in FIG. 1, the system 100 includes a server device(s) 102, a network 108, and a client device 110. As further illustrated in FIG. 1, the server device(s) 102 and the client device 110 communicate via the network 108.

In one or more implementations, the server device(s) 102 includes, but is not limited to, a computing (or computer) device (as explained below with reference to FIG. 13). As shown in FIG. 1, the server device(s) 102 include a digital graphics system 104 which further includes the digital geometric drawing system 106. The digital graphics system 104 generates, creates, modifies, uploads, and/or renders various digital content, such as, but not limited to, vector and/or raster drawing tools (e.g., vector and/or raster brush tools), images, animations, and/or videos.

Moreover, as explained below, the digital geometric drawing system 106, in one or more embodiments, enables a simulation of drawing a digital spirograph designs within electronic drawing applications. In some implementations, the digital geometric drawing system 106 receives a user interaction to move a contact point within a secondary shape while the secondary shape rotates along a virtual curve path created from a primary curve to simulate an animated drawing of a spirograph within a graphical user interface. Furthermore, in one or more implementations, the digital geometric drawing system 106 enables modifications to generated line drawing-based digital spirograph designs, such as, transformations, appearance changes, and/or duplication.

Furthermore, as shown in FIG. 1, the system 100 includes the client device 110. In one or more implementations, the client device 110 includes, but is not limited to, a mobile device (e.g., smartphone, tablet), a laptop, a desktop, or any other type of computing device, including those explained below with reference to FIG. 13. In certain implementations, although not shown in FIG. 1, the client device 110 is operated by a user to perform a variety of functions (e.g., via the digital graphics application 112). For example, the client device 110 performs functions such as, but not limited to, receive user interactions to enable a simulation of drawing a digital spirograph designs within electronic drawing application.

To access the functionalities of the digital geometric drawing system 106 (as described above), in one or more implementations, a user interacts with the digital graphics application 112 on the client device 110. For example, the digital graphics application 112 includes one or more software applications installed on the client device 110 (e.g., to simulate digital drawings of spirographs in accordance with one or more implementations herein). In some cases, the digital graphics application 112 is hosted on the server device(s) 102. In addition, when hosted on the server device(s) 102, the digital graphics application 112 is accessed by the client device 110 through a web browser and/or another online interfacing platform and/or tool.

Although FIG. 1 illustrates the digital geometric drawing system 106 being implemented by a particular component and/or device within the system 100 (e.g., the server device(s) 102), in some implementations, the digital geometric drawing system 106 is implemented, in whole or in part, by other computing devices and/or components in the system 100. For example, in some implementations, the digital geometric drawing system 106 is implemented on the client device 110 within the digital graphics application 112 (e.g., via a client digital geometric drawing application 114). Indeed, in one or more implementations, the description of (and acts performed by) the digital geometric drawing system 106 are implemented (or performed by) the client digital geometric drawing application 114 when the client device 110 implements the digital geometric drawing system 106. More specifically, in some instances, the client device 110 (via an implementation of the digital geometric drawing system 106 on the client digital geometric drawing application 114) enables a simulation of drawing a digital spirograph designs within electronic drawing applications.

Additionally, as shown in FIG. 1, the system 100 includes the network 108. As mentioned above, in some instances, the network 108 enables communication between components of the system 100. In certain implementations, the network 108 includes a suitable network and may communicate using any communication platforms and technologies suitable for transporting data and/or communication signals, examples of which are described with reference to FIG. 13. Furthermore, although FIG. 1 illustrates the server device(s) 102 and the client device 110 communicating via the network 108, in certain implementations, the various components of the system 100 communicate and/or interact via other methods (e.g., the server device(s) 102 and the client device 110 communicating directly).

Figure 2:
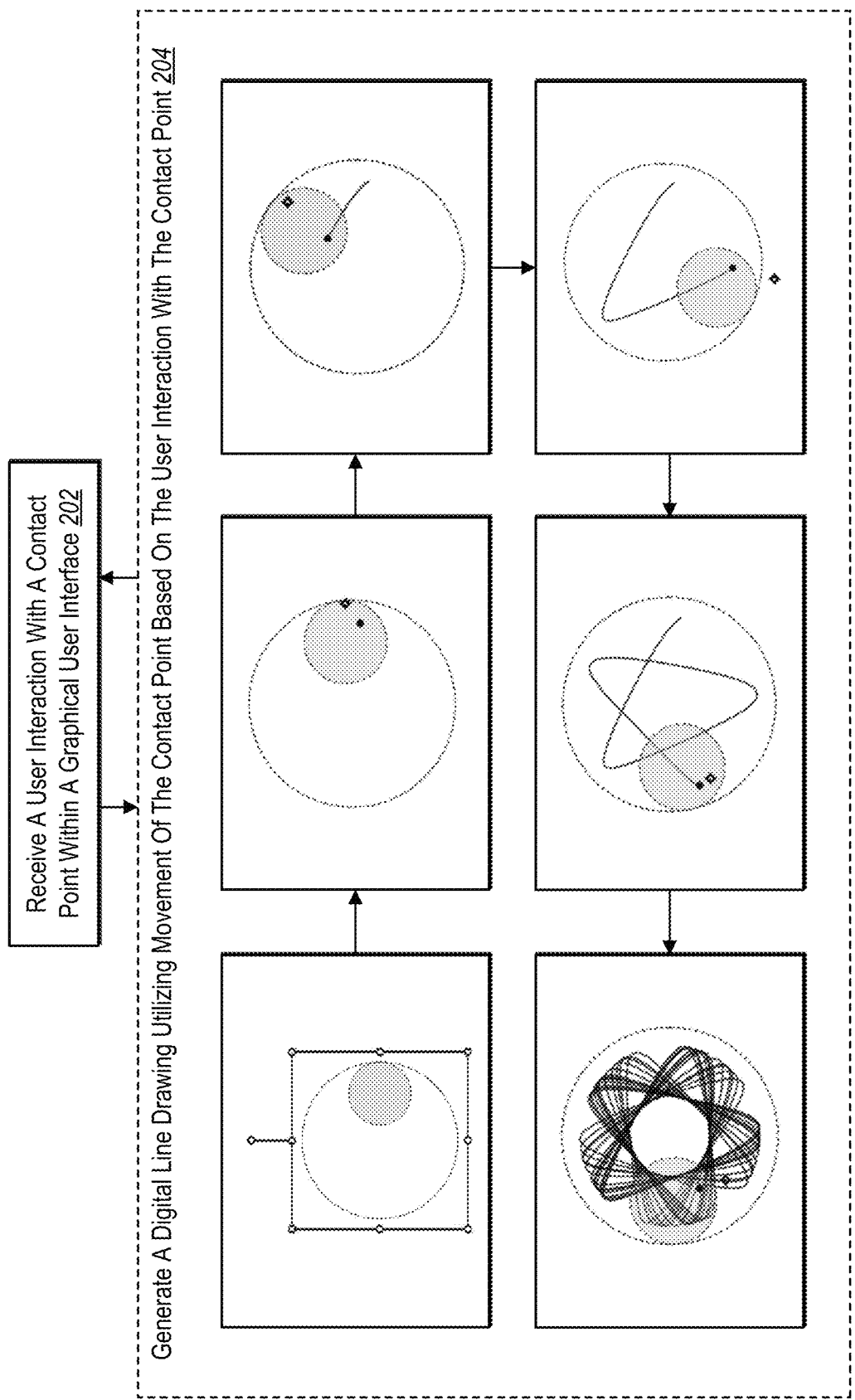
FIG. 2 illustrates an exemplary flow of a digital geometric drawing system generating a digital line drawing that animates a drawing of a digital spirograph in accordance with one or more implementations.

As mentioned above, in one or more embodiments, the digital geometric drawing system 106 enables a simulation of drawing a digital spirograph design within electronic drawing applications. For instance, FIG. 2 illustrates an exemplary flow of the digital geometric drawing system 106 generating a digital line drawing that animates a drawing of a digital spirograph in response to a user interaction moving a contact point within a graphical user interface. Indeed, FIG. 2 illustrates the digital geometric drawing system 106 utilizing a lightweight technique as described below (e.g., in relation to FIGS. 3 and 4) to enable a user interaction to simulate a drawing of a digital spirograph using two shapes.

For instance, as shown in act 202 of FIG. 2, the digital geometric drawing system 106 receives a user interaction with a contact point within a graphical user interface (e.g., to move the contact point). In response to receiving the user interaction with the contact point (in the act 202), as shown in act 204 of FIG. 2, the digital geometric drawing system 106 generates a digital line drawing utilizing movement of the contact point. Indeed, as shown in FIG. 2, as the user interaction is received to move the contact point, the digital geometric drawing system 106 moves the contact point from a first location to a second location using updated positions of the contact point based on a rotation of a secondary shape (e.g., the smaller circle) with a secondary curve that also moves with the contact point along a primary shape (e.g., the larger circle) with a primary curve. As further shown in FIG. 2, as the position of the contact point is updated, the digital geometric drawing system 106 also generates a digital line drawing at each position of the contact point to simulate an animated drawing of a digital spirograph within a graphical user interface (e.g., a live brush and/or drawing effect that generates a spirograph design).

In one or more embodiments, a shape includes a geometric object (e.g., polygons) having an external boundary and/or outline. In one or more instances, a shape includes, but is not limited to, a circle, a square, a rectangle, an ellipse, an oval, a triangle, a star, a diamond, a trapezoid, and/or a user defined polygon. Furthermore, in one or more cases, a curve includes a line or various lines (e.g., straight lines, non-straight line) that form a shape. In some cases, a curve includes a graphical line or path that indicates a boundary of a shape within a coordinate plane (or other graphical plane).

Additionally, in one or more implementations, a contact point includes a coordinate (or other data representation) that indicates an interaction of a drawing tool (e.g., a brush tool, a pencil tool, an ink tool) within a coordinate plane. In particular, in one or more implementations, the contact point includes a position at which to generate a digital line drawing selected by a user interaction within a coordinate plan of a drawing tool application (e.g., within an electronic canvas or image). In one or more instances, the digital geometric drawing system receives an initial position of a contact point and updates a position of the contact point separately from user interactions moving the contact point (e.g., a click and drag interaction that does not keep the cursor on the contact point yet still instructs movement of the contact point).

In addition, in one or more embodiments, a digital line drawing includes a graphical object representing a line (e.g., a straight line or a curved line). In one or more implementations, a digital line drawing includes a vector-based line drawing within a graphical user interface and/or a raster-based line drawing within a graphical user interface. Furthermore, in one or more instances, the digital geometric drawing system utilizes drawing tool interaction to generate a digital line drawing. For instance, a drawing tool includes, but is not limited to, an electronic pencil tool, an ink tool, a paint brush tool (e.g., watercolor brush, acrylic brush, oil brush), an electronic marker tool, and/or a carving tool.

In one or more instances, a movement path includes a collection of coordinates in which a point (e.g., a center point of a shape, a contact point) moves along. In some cases, the movement path includes a line or a curve that creates a shape. In addition, in one or more embodiments, a movement distance includes a representation of a displacement of position within a movement path by a point (e.g., a center point of a shape, a contact point). In some cases, a movement distance includes a value representing a distance of travel on a movement path by a point.

Additionally, in one or more embodiments, a spirograph design includes a geometric drawing that represents various mathematical roulette curves. In one or more instances, a spirograph design includes a geometric drawing representing hypotrochoids and/or epitrochoids. In some instances, a spirograph design includes digital mandala art objects (or images).

Figure 3:
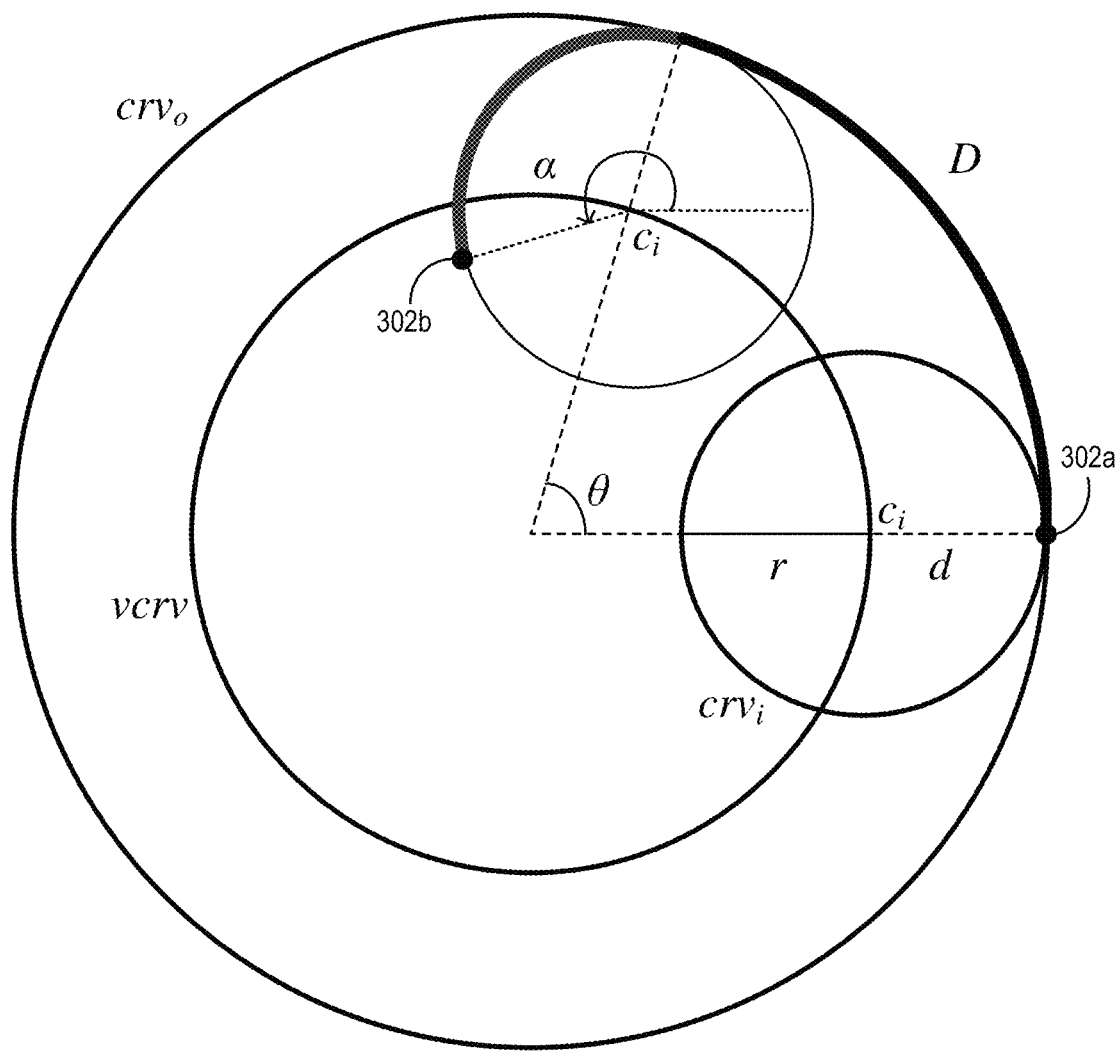
FIGS. 3 and 4 illustrate a digital geometric drawing system utilizing a lightweight shape rotation-based technique for exemplary primary and secondary shapes to simulate a digital drawing of a digital spirograph in accordance with one or more implementations.

As mentioned above, in one or more embodiments, the digital geometric drawing system 106 utilizes a lightweight and efficient technique to enable an accurate simulation of drawing a digital spirograph design within an electronic drawing application. For instance, FIG. 3 illustrates the digital geometric drawing system 106 utilizing the lightweight shape rotation-based technique for an exemplary primary and secondary shape to simulate a drawing of a digital spirograph. For instance, FIG. 3 illustrates a movement of a contact point in relation to a rotation of a secondary curve of a secondary shape along a movement path corresponding to a primary curve of a primary shape based on a user interaction with the contact point (e.g., to generate a digital line drawing along the movement of the contact point).

In one or more embodiments, the digital geometric drawing system 106 represents a curve utilizing a transform matrix in accordance with the following function:

$$\begin{bmatrix} sx & rx \\ ry & sy \\ tx & ty \end{bmatrix} \quad (1)$$

In the above-mentioned function (1), in one or more embodiments, the digital geometric drawing system 106 represents sx and sy as a scale of a curve, rx and ry as a rotation of a curve, and tx and ty as the center position of the curve.

Additionally, as shown in FIG. 3, the digital geometric drawing system 106 identifies a primary curve (represented as $crv_o$) for a primary shape (e.g., a circle). Moreover, as shown in FIG. 3, the digital geometric drawing system 106 identifies a secondary curve (represented as $crv_i$) for a secondary shape (e.g., a circle) with a radius r. In addition, as shown in FIG. 3, the digital geometric drawing system 106 represents a center of the secondary curve $crv_i$ as $c_i$.

Furthermore, as shown in FIG. 3, the digital geometric drawing system 106 further receives a user interaction to establish a contact point 302a (e.g., a user interaction placing a digital drawing tool cursor or electronic stylus interaction) within the secondary shape of the secondary curve $crv_i$. As further shown in FIG. 3, the digital geometric drawing system 106 determines an offset d (e.g., an offset coordinate distance) between the contact point 302a and the center point $c_i$ of the secondary shape of the secondary curve $crv_i$ (e.g., as an offset at which a point is drawn with reference to the center of the secondary curve).

Additionally, as shown in FIG. 3, the digital geometric drawing system 106 determines a movement path (e.g., a virtual curve vcrv) for the center $c_i$ of the secondary curve $crv_i$. In one or more cases, the digital geometric drawing system 106 receives a mode selector (from a client device of a user via a user selection) that indicates whether the secondary curve $crv_i$ rotates on the inside or outside of the primary curve $crv_o$. Moreover, in one or more embodiments, the digital geometric drawing system 106 determines the movement path (e.g., a virtual curve vcrv) to have a shape of the primary curve $crv_o$ with a varied size based on a mode selector, a scale of the primary curve $crv_o$, and/or a scale of the secondary curve $crv_i$. In some instances, the digital geometric drawing system 106 determines the movement path (e.g., a virtual curve vcrv) using a mode selector (mode) and a scale (sx and sy) of the primary and secondary curves in accordance with the following function:

$$vcrv \cdot sx = crv_o \cdot sx + crv_i \cdot sx * mode==outside?1:-1$$

$$vcrv \cdot sy = crv_o \cdot sy + crv_i \cdot sy * mode==outside?1:-1 \quad (2)$$

In the above-mentioned function (2), when the mode selector indicates outside the primary curve (e.g., 1), the digital geometric drawing system 106 adds a scale of the primary curve crv and a scale of the secondary curve $crv_i$ to create a movement path (e.g., a virtual curve vcrv) that is larger (or outside) the primary curve $crv_o$ with the shape of the primary curve $crv_o$. Additionally, in the above-mentioned function (2), when the mode selector indicates inside the primary curve (e.g., −1), the digital geometric drawing system 106 subtracts a scale of the secondary curve $crv_i$ from a scale of the primary curve $crv_o$ to create a movement path (e.g., a virtual curve vcrv) that is smaller (or inside) the primary curve $crv_o$ with the shape of the primary curve $crv_o$.

Additionally, in reference to FIG. 3, upon receiving a user interaction to move the contact point 302a (e.g., when an electronic drawing stroke is started), the digital geometric drawing system 106 fixes the offset coordinate distance d in relation to the contact point 302a inside the secondary curve $crv_i$. In particular, in reference to FIG. 3, the digital geometric drawing system 106 maintains the offset coordinate distance d in relation to the center $c_i$ of the secondary curve $crv_i$ while receiving a user interaction to move the contact point 302a (e.g., until the end of an electronic drawing stroke). Furthermore, as shown in FIG. 3, as the digital geometric drawing system 106 receives a user interaction to move the contact point 302a from a first location to a second location, the digital geometric drawing system 106 rotates the secondary curve $crv_i$ along a boundary of the primary curve $crv_o$ (using the movement path vcrv with the center $c_i$ of the secondary curve $crv_i$). Additionally, as shown in FIG. 3, as the digital geometric drawing system 106 rotates the secondary curve $crv_i$, the offset coordinate distance d corresponding to the contact point 302a is also rotated along the secondary curve $crv_i$ to move the contact point 302a to a second position (as represented by the contact point 302b).

In one or more embodiments, the digital geometric drawing system 106 determines a movement of a position of a center point $c_i$ of the secondary curve $crv_i$ to determine a movement of a contact point (e.g., the contact point 302a). For instance, the digital geometric drawing system 106 utilizes a parametric position of the secondary curve $crv_i$ along the movement path vcrv to determine a movement and a rotation of the secondary curve $crv_i$ (as caused by the user interaction to move the contact point 302a). Then, in one or more implementations, the digital geometric drawing system 106 utilizes the positional and rotational movement of the secondary curve $crv_i$ to determine and project a position of the contact point (for the digital line drawing).

For instance, the digital geometric drawing system 106 determines a parametric position of the center point $c_i$ of the secondary curve $crv_i$ with reference to the movement path vcrv as _prevParameter. Moreover, in one or more instances, upon receiving a user interaction to move the contact point (e.g., receiving a digital drawing stroke), the digital geometric drawing system 106 moves the secondary curve $crv_i$ to a position p and further calculates the nearest point which lies on the movement path vcrv to obtain a parametric position for the nearest point (as _parameter). Furthermore, in one or more implementations, the digital geometric drawing system 106 moves from position _prevParameter to the position _parameter clockwise or anticlockwise using the following function:

if (_prevParameter≤parameter)
{
   clockwiseParametricDistance=_parameter-_prevParameter;
   antiClockwiseParametricDistance=_prevParameter+ maxParameter-_parameter;
}
else (3)
{
   clockwiseParametricDistance=maxParameter-_prevParameter+_parameter;
   antiClockwiseParametricDistance=_prevParameter-_parameter;
}

In some cases, the digital geometric drawing system 106 utilizes a difference calculated between _prevParameter and _parameter for both clockwise and anticlockwise distances and selects a clockwise or anticlockwise distance based on the minimum difference as the movement distance. Furthermore, in one or more embodiments, the digital geometric drawing system 106 sets an epsilon value for the parameter update to a positive value (e.g., 0.001, 0.002) when a clockwise distance is less than an anticlockwise distance. Otherwise, in one or more embodiments, the digital geometric drawing system 106 sets an epsilon value for the parameter update to a negative value (e.g., -0.0001, -0.002).

Furthermore, in one or more embodiments, the digital geometric drawing system 106 loops from the positional value of _prevParameter to the positional value of parameter while increasing the value with epsilon. For example, the digital geometric drawing system 106 traverses between multiple points from a first position of the center point of the secondary curve to the second position with a value increasing by epsilon from _prevParameter to parameter for multiple parameter updates during the user interaction with the contact point. In one or more cases, the digital geometric drawing system 106 utilizes the distance between the positional value of _prevParameter to the positional value of parameter to determine a movement distance (e.g., D in reference to FIG. 3) of the center point of the secondary curve.

For instance, the digital geometric drawing system 106 utilizes the multiple points (as points on a Bezier curve) to determine the movement distance D by traversing between the points and projecting the in-between points by looping through multiple parameter updates to calculate the distance between the points lying on the movement path vcrv for the _prevParameter and parameter. Moreover, in one or more cases, the digital geometric drawing system 106 combines (e.g., add when clockwise and subtract when anticlockwise) the overall distance from each parameter update to determine the movement distance D of the secondary shape of the secondary curve (as shown in FIG. 3).

In addition, as mentioned above, the digital geometric drawing system 106 utilizes the movement distance of the secondary curve and the rotation of the secondary curve to project positions of the contact point (in response to a user interaction moving the contact point). For instance, in one or more embodiments (and in reference to FIG. 3), the digital geometric drawing system 106 determines an angle θ from a center point of primary curve $crv_o$ between a first position of the center point $c_i$ of the secondary curve $crv_i$ and a second position of the center point $c_i$ of the secondary curve $crv_i$ (e.g., based on movement of the center point $c_i$ of the secondary curve $crv_i$ from the user interaction moving the contact point 302a). Furthermore, in one or more instances, the digital geometric drawing system 106 also determines a secondary curve rotation angle α utilizing the movement distance D and the angle θ from the center point of the primary curve $crv_o$. In particular, in one or more implementations, the digital geometric drawing system 106 determines the secondary curve rotation angle α using the angle θ from the center point of the primary curve $crv_o$, the movement distance D, and a radius of the secondary curve $crv_i$ in accordance with the following function:

$$\alpha = \theta - D/r \quad (4)$$

Furthermore, in one or more embodiments, the digital geometric drawing system 106 utilizes the secondary curve rotation angle α to project positions of the contact point (in response to a user interaction moving the contact point). In particular, in one or more embodiments (and in reference to FIG. 3), the digital geometric drawing system 106 continuously determines positions d of the contact point using the offset distance coordinates from the center point $c_i$ of the secondary curve $crv_i$ combined with the secondary curve rotation angle $\alpha$ and the position of the center point $c_i$ of the secondary curve $crv_i$. For example, the digital geometric drawing system 106 determines an x coordinate (e.g., newPoint·x) and y coordinate (e.g., newPoint·y) of the contact point using the x and y coordinate of the center point $c_i$ of the secondary curve $crv_i$ and the offset distance coordinates d from the center point $c_i$ of the secondary curve $crv_i$ combined with the secondary curve rotation angle $\alpha$ in accordance with the following function:

newPoint·x=$crv_i$·x+d*cos($\alpha$)

newPoint·y=$crv_i$·y+d*sin($\alpha$)  (5)

In one or more embodiments, the digital geometric drawing system 106 continuously updates a position of the contact point using updated movements of the secondary curve $crv_i$ as caused by a user interaction moving the contact point from a first position to a second position (e.g., via a drag interaction of an electronic drawing stroke). For instance, the digital geometric drawing system 106 continuously updates position values for _prevParameter and Parameter and utilizes an updated movement distance D and updated angle $\theta$ from a center point of primary curve $crv_o$ between a first position of the center point $c_i$ of the secondary curve $crv_i$ and a second position of the center point $c_i$ of the secondary curve $crv_i$ to determine an updated secondary curve rotation angle $\alpha$. Then, in or more cases, the digital geometric drawing system 106 utilizes the updated secondary curve rotation angle $\alpha$, the updated position of the center point $c_i$ of the secondary curve $crv_i$, and the offset distance coordinates d to project updated positions of the contact point (in response to a user interaction moving the contact point). In one or more instances, the digital geometric drawing system 106 continuously generates a digital line drawing to connect the updated positions of the contact point (as described herein).

Figure 4:
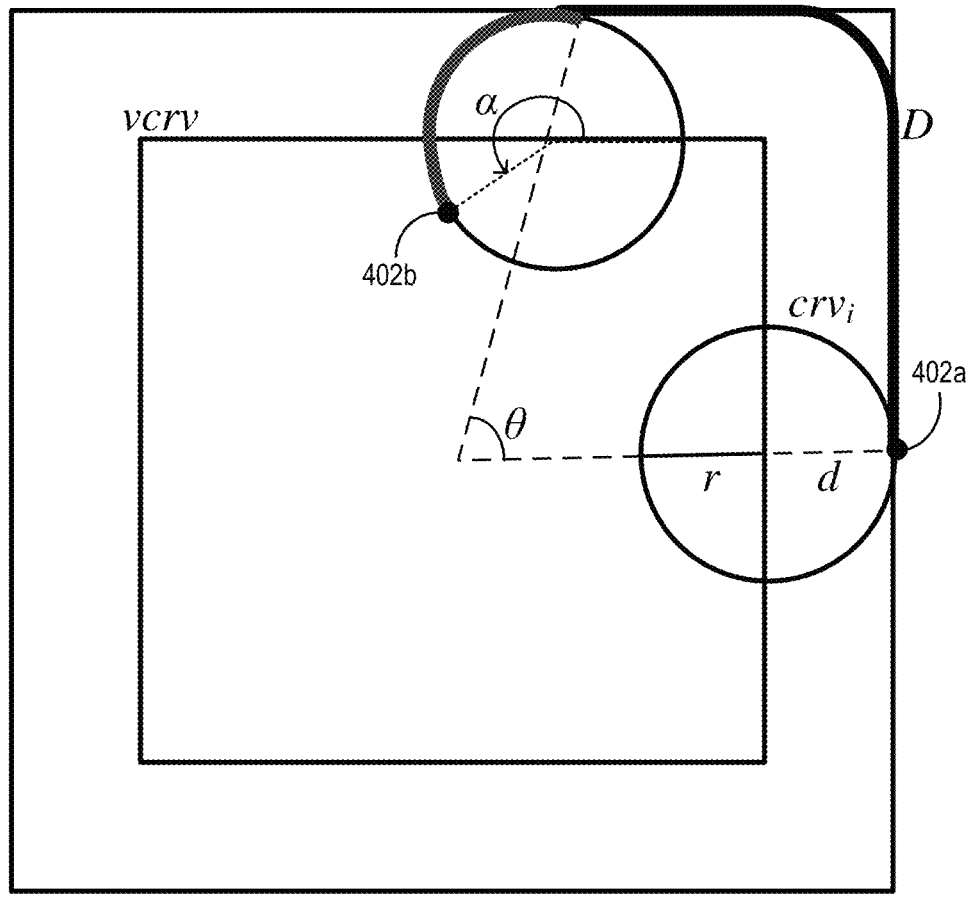

Furthermore, although FIG. 3 illustrates the digital geometric drawing system 106 determining updated positions of the contact point within a primary shape of a circle based on user interactions to move the contact point, the digital geometric drawing system 106, in one more embodiment, utilizes the lightweight shape rotation-based technique with various primary and secondary shapes to simulate a drawing of a digital spirograph. For instance, FIG. 4 illustrates the digital geometric drawing system 106 utilizing the lightweight shape rotation-based technique (e.g., based on the functions (1)-(5) above) for an exemplary primary shape of a square and secondary shape to simulate a drawing of a digital spirograph. For instance, FIG. 4 illustrates a movement of a contact point in relation to a rotation of a secondary curve of a secondary shape along a movement path corresponding to a primary curve of a square shape (e.g., the primary shape) based on a user interaction with the contact point (e.g., to generate a digital line drawing along the movement of the contact point).

For example, as shown in FIG. 4, the digital geometric drawing system 106 identifies a primary curve (represented as $crv_o$) for a primary shape (e.g., a square). Additionally, as shown in FIG. 4, the digital geometric drawing system 106 identifies a secondary curve (represented as $crv_i$) for a secondary shape (e.g., a circle) with a radius r. Then, as shown in FIG. 4, the digital geometric drawing system 106 further receives a user interaction to establish a contact point 402a (e.g., a user interaction placing a digital drawing tool cursor or electronic stylus interaction) within the secondary shape of the secondary curve $crv_i$. In addition, as shown in FIG. 4, the digital geometric drawing system 106 determines an offset d (e.g., an offset coordinate distance) between the contact point 402a and the center point of the secondary shape of the secondary curve $crv_i$ (as described above).

Furthermore, as shown in FIG. 4, the digital geometric drawing system 106, the digital geometric drawing system 106 determines a movement path (e.g., a virtual curve vcrv) for the center of the secondary curve $crv_i$. Indeed, in one or more embodiments, the digital geometric drawing system 106 determines the movement path (e.g., a virtual curve vcrv) to have a shape of the primary curve $crv_o$ with a varied size based on a mode selector (for an inside or outside of the primary shape selection), a scale of the primary curve $crv_o$, and/or a scale of the secondary curve $crv_i$ as described above (e.g., in reference to function (2)).

Moreover, as shown in FIG. 4, upon receiving a user interaction to move the contact point 402a (e.g., when an electronic drawing stroke is started), the digital geometric drawing system 106 fixes the offset coordinate distance d in relation to the contact point 402a inside the secondary curve $crv_i$. Furthermore, as shown in FIG. 4, as the digital geometric drawing system 106 receives a user interaction to move the contact point 402a from a first location to a second location, the digital geometric drawing system 106 rotates the secondary curve $crv_i$ along a boundary of the primary curve $crv_o$ (using the movement path vcrv with the center of the secondary curve $crv_i$). Additionally, as shown in FIG. 4, as the digital geometric drawing system 106 rotates the secondary curve $crv_i$, the offset coordinate distance d corresponding to the contact point 402a is also rotated along the secondary curve $crv_i$ to move the contact point 402a to a second position (as represented by the contact point 402b).

In one or more embodiments, in reference to FIG. 4, the digital geometric drawing system 106 determines a movement of a position of a center point of the secondary curve $crv_i$ to determine a movement of a contact point (e.g., the contact point 402a) using parametric positions as described above. Furthermore, in one or more instances, the digital geometric drawing system 106 utilizes the positional and rotational movement of the secondary curve $crv_i$ to determine and project a position of the contact point (for the digital line drawing). Indeed, in reference to FIG. 4, the digital geometric drawing system 106 determines the movement distance D of the secondary curve $crv_i$ along the square primary curve $crv_o$ in accordance with one or more embodiments herein.

Subsequently, in reference to FIG. 4, the digital geometric drawing system 106 utilizes the movement distance of the secondary curve and the rotation of the secondary curve (along the square primary curve) to project positions of the contact point (in response to a user interaction moving the contact point). For example, the digital geometric drawing system 106 determines an angle $\theta$ from a center point of primary curve $crv_o$ between a first position of the center point of the secondary curve $crv_i$ and a second position of the center point of the secondary curve $crv_i$ (e.g., based on movement of the center point of the secondary curve $crv_i$ from the user interaction moving the contact point 402a) as described above. Moreover, in one or more embodiments (and in reference to FIG. 4), the digital geometric drawing system 106 determines a secondary curve rotation angle $\alpha$ utilizing the movement distance D and the angle $\theta$ from the center point of the primary curve $crv_o$ as described above (e.g., in reference to function (4)). Moreover, in one or more implementations (and in reference to FIG. 4), the digital geometric drawing system 106 continuously determines positions of the contact point using the offset distance coordinates d from the center point of the secondary curve $crv_i$ combined with the secondary curve rotation angle α and the position of the center point $c_i$ of the secondary curve $crv_i$ as described above (in reference to function (5)). Indeed, in one or more instances, the digital geometric drawing system 106 continuously generates a digital line drawing to connect the updated positions of the contact point along the rotation of the secondary curve of the secondary shape along the movement path corresponding to the primary curve of the square shape (e.g., the primary shape) to simulate a drawing of a spirograph design (as described herein).

Although FIGS. 3 and 4 illustrate a contact point shown on a boundary of a secondary shape, in one or more embodiments, the digital geometric drawing system 106 utilizes a contact point in various positions within the secondary shape. For instance, the digital geometric drawing system 106 identifies a contact point (from a user interaction) within an area of the secondary shape and determines an offset distance coordinate between the center point of the secondary shape and the contact point within the area of the secondary shape. Moreover, in one or more embodiments, as the digital geometric drawing system 106 rotates the secondary curve, the offset coordinate distance corresponding to the contact point that is positioned within the secondary shape is also rotated along the secondary curve to move the contact point to a second position while remaining the same (local) position in relation to the center point of the secondary shape.

Figure 5A:
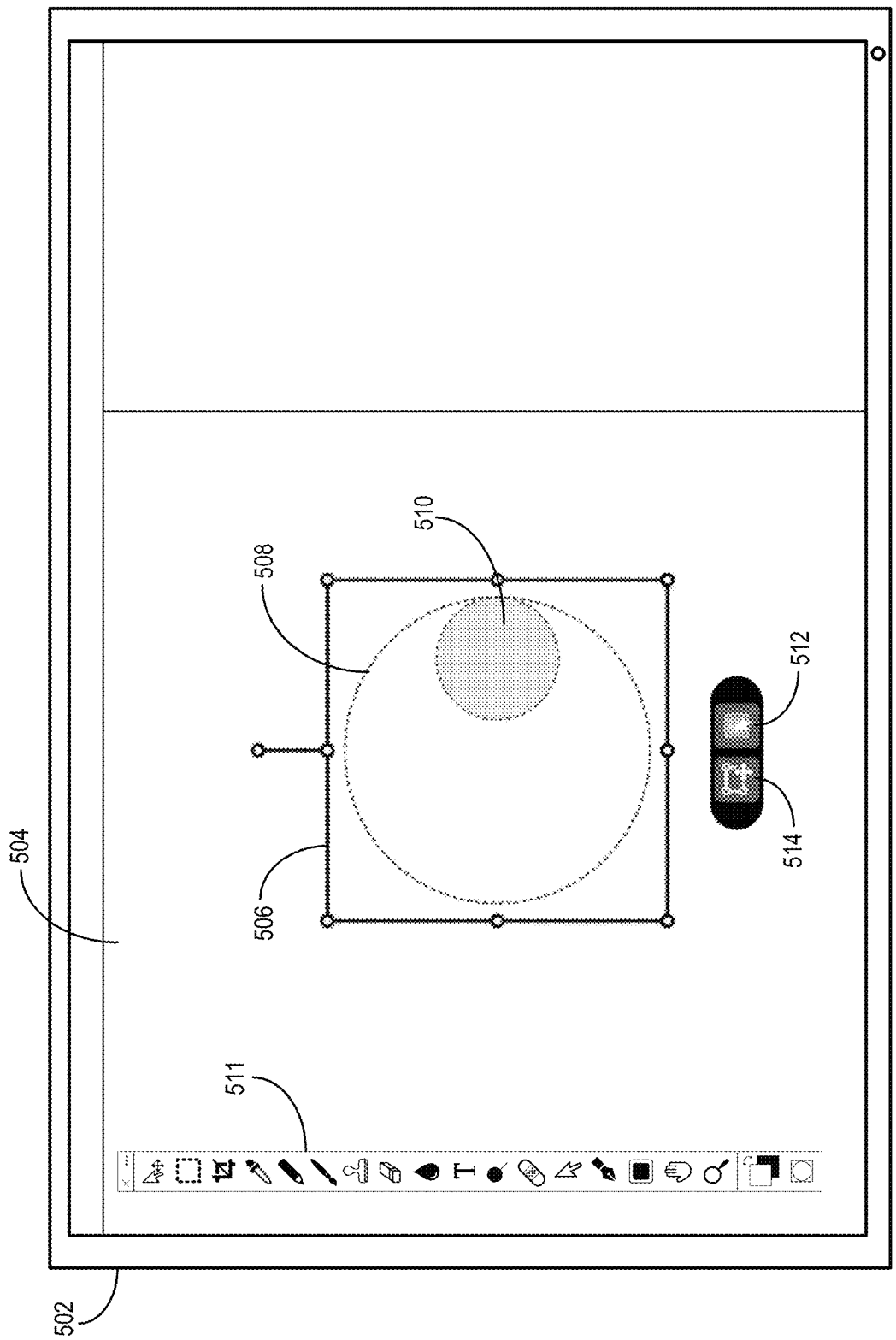
Figure 5B:
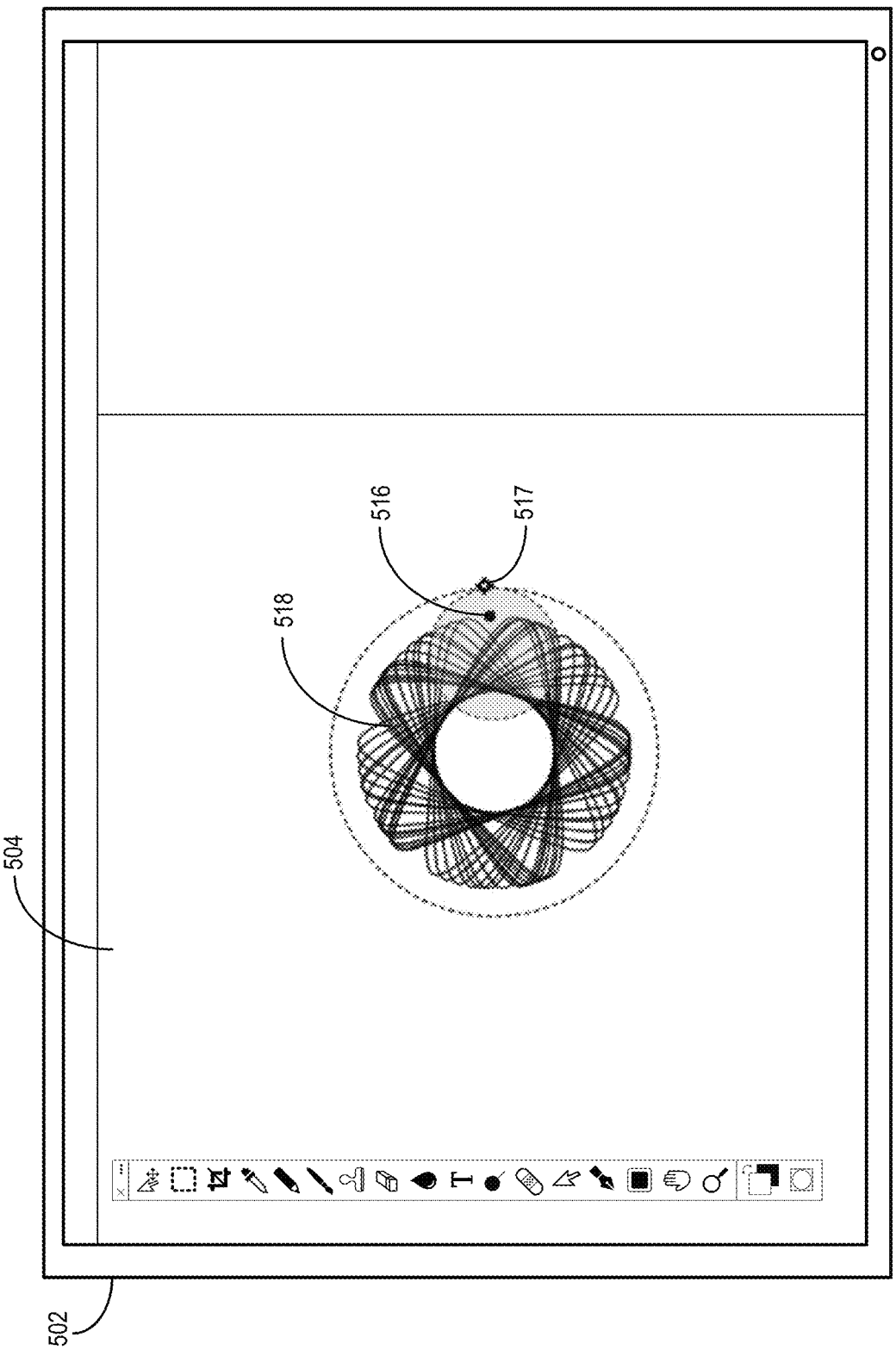

As mentioned above, in one or more embodiments, the digital geometric drawing system 106 enables a simulation of digital spirograph designs within electronic drawing applications with robust modification options for the generated digital spirograph designs. For instance, FIGS. 5A-5C illustrate the digital geometric drawing system 106 implementing the lightweight technique as described below (e.g., in relation to FIGS. 3 and 4) to enable a user interaction to simulate an electronic drawing of a digital spirograph using two shapes within a drawing application with robust modification options. Furthermore, FIGS. 5A-5C also illustrate the digital geometric drawing system 106 enabling a selection of multiple shapes (inside and outside) a primary shape to simulate an electronic drawing of a multiple digital spirographs (in relation to a unifying primary shape).

As shown in FIG. 5A, the digital geometric drawing system 106 provides, for display within a drawing application graphical user interface 504 on a client device 502, various digital tools to enable a simulation of digital spirograph designs. For instance, as shown in FIG. 5A, the digital geometric drawing system 106 displays a selectable shape selector 512 to select a primary shape 508 (corresponding to a primary curve) and a secondary shape 510 (corresponding to a secondary curve). In some instances, the digital geometric drawing system 106 provides a menu of shapes to select a primary shape and/or a secondary shape.

Additionally, as shown in FIG. 5A, the digital geometric drawing system 106 displays a selectable shape transformation option 514 to enable a transformation selector 506 within the drawing application graphical user interface 504. Indeed, in one or more embodiments, the digital geometric drawing system 106 receives user interactions with the selectable shape transformation option 514 and, in response, changes (or transforms) attributes, such as, but not limited to, a scale or shape of the primary shape 508 and/or secondary shape 510 and/or a rotation of the primary shape 508 and/or secondary shape 510.

Additionally, as shown in FIG. 5A, the digital geometric drawing system 106 also displays, within the drawing application graphical user interface 504, various selectable drawing tools 511. In particular, in one or more embodiments, the digital geometric drawing system 106 receives user selections with the selectable drawing tools 511 to select and/or implement various electronic drawing tools, such as, but not limited to, color selections for the digital line drawings, drawing tool brush and/or stylus types, opacities, and/or other modifications applicable on a digital line drawing. Indeed, in one or more instances, the digital geometric drawing system 106 utilizes user selections (or interactions) with the various selectable drawing tools 511 to incorporate drawing tool attributes prior to generating a digital line drawing and/or on an existing digital line drawing.

Furthermore, as shown in the transition from FIG. 5A to FIG. 5B, the digital geometric drawing system 106 generates, for display within the drawing application graphical user interface 504 in the client device 502, a digital line drawing 518 that simulates a spirograph design upon receiving a continuous user interaction 517 with a contact point 516 (in accordance with one or more implementations herein).

Subsequently, as shown in the transition from FIG. 5B to FIG. 5C, the digital geometric drawing system 106 enables a selection of an additional secondary shape to generate an additional line drawing for an additional spirograph design. As shown in FIG. 5C, the digital geometric drawing system 106 provides, for display within the drawing application graphical user interface 504 in the client device 502, a selectable shape selector 520. Upon receiving a selection from the selectable shape selector 520, as shown in FIG. 5C, the digital geometric displays (or introduces) an additional secondary shape 524 (with an additional secondary curve) along the primary shape 526 that includes the digital line drawing 518 (e.g., depicting a first spirograph design). In addition, as shown in FIG. 5C, upon receiving an interaction with a mode selector (e.g., from a selectable shape transformation option 530), the digital geometric drawing system 106 introduces (or displays) the additional secondary shape 524 on the outside of the primary shape 526.

Figure 5D:
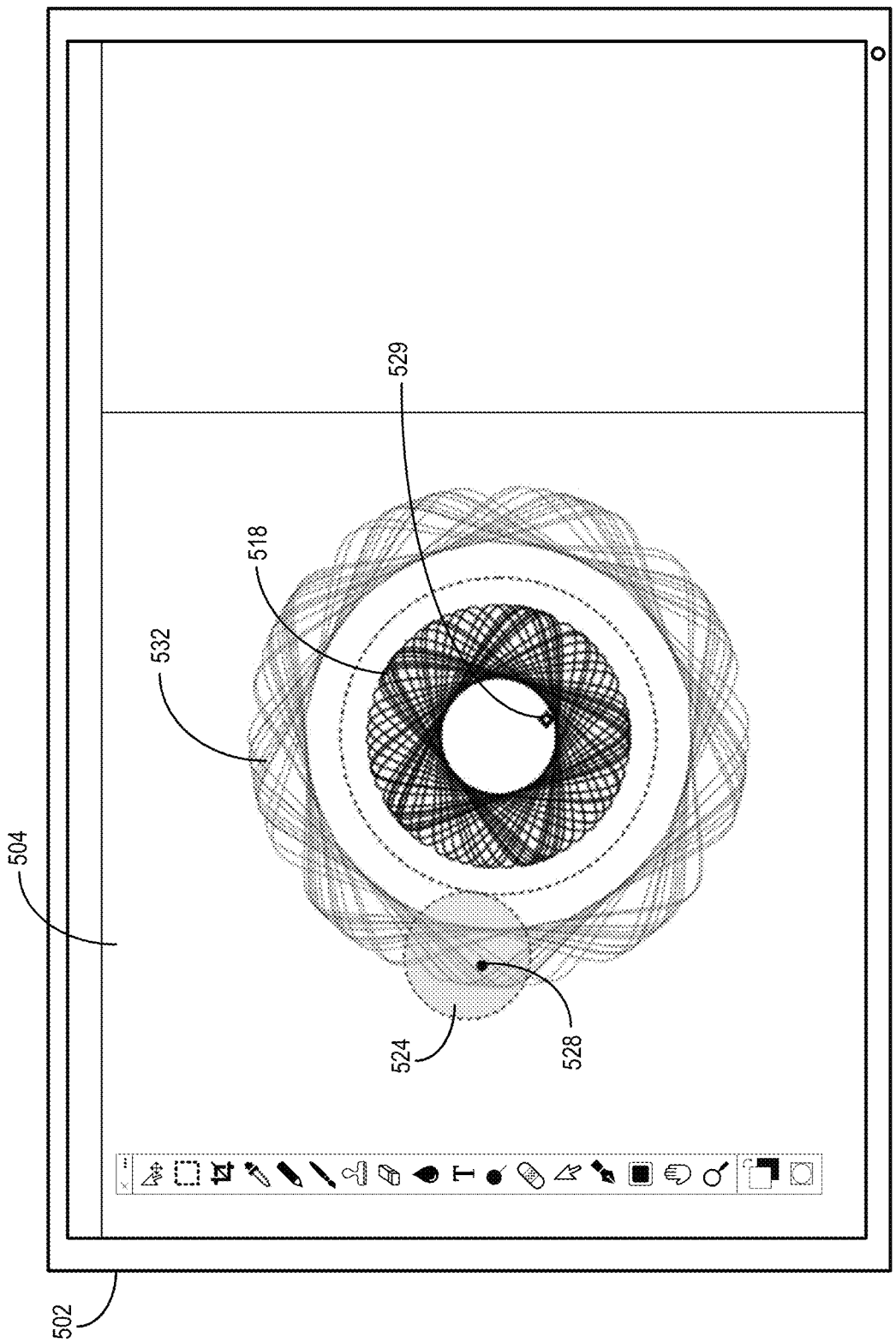

Furthermore, as shown in FIG. 5C, upon receiving a user interaction 529 to move a contact point 528, the digital geometric drawing system 106 begins to move the additional secondary shape 524 along the primary shape 526 to cause a rotation of the additional secondary shape 524 (and movement of the contact point 528). Indeed, as shown in FIG. 5C, the digital geometric drawing system 106 generates an additional digital line drawing 532 along the movement of the contact point 528 (in accordance with one or more implementations herein) in response to the user interaction 529. For instance, as shown in the transition from FIG. 5C to FIG. 5D, in response to the continuous user interaction 529, the digital geometric drawing system 106 generates the additional digital line drawing 532 (that depicts an additional spirograph design) using the movement of the contact point 528 (in relation to the movement of the additional secondary shape 524 on the boundary of the primary shape 526) in accordance with one or more implementations herein.

In one or more instances, the digital geometric drawing system 106 utilizes varying colors for different digital line drawings (for different spirograph designs). For example, the digital geometric drawing system 106 enables user selection of a color (e.g., from a color swatch) to modify a color of a digital line drawing. In one or more cases, the digital geometric drawing system 106 utilizes various combinations of colors per digital line drawings. For instance, as shown in 5D, the digital geometric drawing system 106 utilizes a first color for the digital line drawing 518 and a second color for the additional digital line drawing 532. In some instances, the digital geometric drawing system 106 enables switching a color of a drawing tool for a digital line drawing such that a generated digital line drawing comprises different colors at different positions of the digital line drawing.

In some cases, the digital geometric drawing system 106 enables switching between shapes and/or inside and/or outside positions (e.g., via a model selector). In some cases, the digital geometric drawing system 106 enables switching between inside and/or outside positions (via a mode selector) utilizing a single user interaction click option (e.g., a toggle switch). Furthermore, in some cases, the digital geometric drawing system 106 also enables user interactions to switch shapes (e.g., shapes of the primary curve) in between electronic drawing strokes (e.g., while generating a digital line drawing) to vary the shape of a spirograph created by the rotation of the secondary curve along the various primary curves. In one or more embodiments, the digital geometric drawing system 106 also enables user interactions to switch the primary curve for additional digital line drawings to generate multiple spirograph designs (in a single graphical user interface) having varied shapes and designs due to travel of a contact point along the various primary curve shapes (in accordance with one or more implementations herein).

In one or more embodiments, the digital geometric drawing system 106 retains a contact point when a user interaction is interrupted (e.g., lifting a digital marker and/or electronic stylus during an electronic drawing stroke). For instance, the digital geometric drawing system 106 tracks and retains a position of the contact point within a secondary curve upon detecting that a user interaction has ceased with an electronic cursor, marker, and/or stylus to cause the movement of the contact point. Subsequently, in one or more instances, upon detecting a subsequent user interaction with the electronic cursor, marker, and/or stylus to cause the movement of the contact point, the digital geometric drawing system 106 continues movement of the contact point from the previously retained position of the contact point (e.g., snaps to the previously retained position) to generate a continuous digital line drawing for the simulated drawing of the spirograph design. In some cases, the digital geometric drawing system 106 continuous movement of the contact point from the previously retained position upon detecting that the subsequent user interaction is within a threshold distance (e.g., 10 pixels, 20 pixels, 30 pixels) from the retained contact point.

In one or more instances, the digital geometric drawing system 106 resets a contact point position and/or initiates a new contact point position for an additional digital line drawing. For instance, upon receiving a user interaction requesting an additional digital line drawing, the digital geometric drawing system 106 resets a position of a contact point to a position of an initial user interaction within an additional secondary curve. Then, in one or more embodiments, the digital geometric drawing system 106 projects updated positions of the contact point in the additional secondary curve based on user interactions to move the contact point as described above.

In some implementations, the digital geometric drawing system 106 enables a user interaction to move a secondary shape along the boundary of a primary shape without generating a digital line drawing but retaining the contact point. In one or more instances, the digital geometric drawing system 106 moves the secondary shape along the boundary of the primary shape while retaining the contact point position (according to the rotation as described above) without generating a digital line drawing to create vacant space within a spirograph design. In some instances, the digital geometric drawing system 106 continues movement of the contact point from the previously retained position of the contact point to generate a continuous digital line drawing for the simulated drawing of the spirograph design (from the new position of the secondary shape).

Additionally, in one or more embodiments, the digital geometric drawing system 106 enables a user interaction to set a new contact point position within a secondary shape to initiate a new line drawing within the same secondary shape. In particular, in one or more embodiments, the digital geometric drawing system 106 continues movement of the contact point from the new position of the contact point to generate an additional continuous digital line drawing for the simulated drawing of the spirograph design using a rotation of the same secondary shape (in accordance with one or more implementations herein). Indeed, in one or more cases, the digital geometric drawing system 106 enables user interactions to set various numbers of new contact point positions within a secondary shape.

Furthermore, in one or more embodiments, a user interaction to move the contact point is not tied to the contact point. In particular, in one or more cases, the digital geometric drawing system 106 receives a user interaction to set a contact point within a secondary shape. Then, upon receiving updated movements of the user interaction to move the contact point, in one or more embodiments, the digital geometric drawing system 106 updates the position of the contact point (as described above) while freely (and separately) receiving user interactions of a cursor away from the contact point. In particular, in one or more instances, the digital geometric drawing system 106 utilizes the user interactions of the cursor (e.g., to move the contact point) by utilizing a direction and distance of movement from the cursor to translate the direction and distance of movement to the contact point (and secondary curve) as described above. For example, as shown in FIG. 5C, the digital geometric drawing system 106 moves (or updates a position of) the contact point 528 separately from the user interaction 529 causing the movement of the contact point 528.

Additionally, in one or more embodiments, the digital geometric drawing system receives a user selection of a particular drawing tool type (e.g., an electronic pencil tool, an electronic brush tool, an electronic pen tool, an electronic spray paint tool). Then, in one or more embodiments, the digital geometric drawing system utilizes the selected particular drawing tool to generate digital line drawings with the primary shape and the secondary shape (as described herein) to simulate a spirograph design. In one or more implementations, the digital geometric drawing system 106 utilizes various drawing tool types to generate digital line drawings with different visual attributes (e.g., a pencil effect, an ink effect, an acrylic paint effect, an oil paint effect, a spray paint effect, a watercolor effect, a carving effect). In addition, in one or more instances, the digital geometric drawing system 106 utilizes live electronic brushes that visually mix and/or interact with previously generated line drawings to create realistic paint brush effects (e.g., watercolor effects that mix with other watercolor effect and/or other paint effects, highlighted colors that form new colors upon mixing, increased darkness of a color upon multiple line drawing passes). Furthermore, in some cases, the digital geometric drawing system 106 also enables user interactions to switch drawing tools in between electronic drawing strokes (e.g., while generating a digital line drawing) to vary the visual attribute of a spirograph created at different portions (e.g., drawing a first half of a spirograph with an electronic watercolor brush effect and a second half of a spirograph with an electronic pencil effect).

In one or more embodiments, the digital geometric drawing system 106 also enables various modifications of a digital line drawing representing a spirograph. In particular, in one or more instances, the digital geometric drawing system 106 enables user interactions within a drawing application graphical user interface to transform a generated digital line drawing representing a spirograph (e.g., to resize and/or reshape the digital line drawing). Moreover, in one or more instances, the digital geometric drawing system 106 also enables movement of the digital line drawing representing a spirograph (e.g., to different positions and/or rotations). In some cases, the digital geometric drawing system 106 enables snapping the digital line drawing representing a spirograph to other graphics objects during movement of the digital line drawing. In some implementations, the digital geometric drawing system 106 also enables copying and pasting a generated digital line drawing representing a spirograph (e.g., to move the spirograph design across various files and/or to duplicate the spirograph design).

Furthermore, in one or more embodiments, the digital geometric drawing system 106 enables a ratio control between the primary and secondary shape. For example, the digital geometric drawing system 106 provides selectable options to select a ratio between the primary and secondary shape (e.g., using ratios of height and width and/or radii). Then, in one or more embodiments, the digital geometric drawing system 106 resizes the primary shape and/or the secondary shape according to the selected ratio when a user interaction is received to resize one of the primary shape and/or the secondary shape.

Figure 6A:
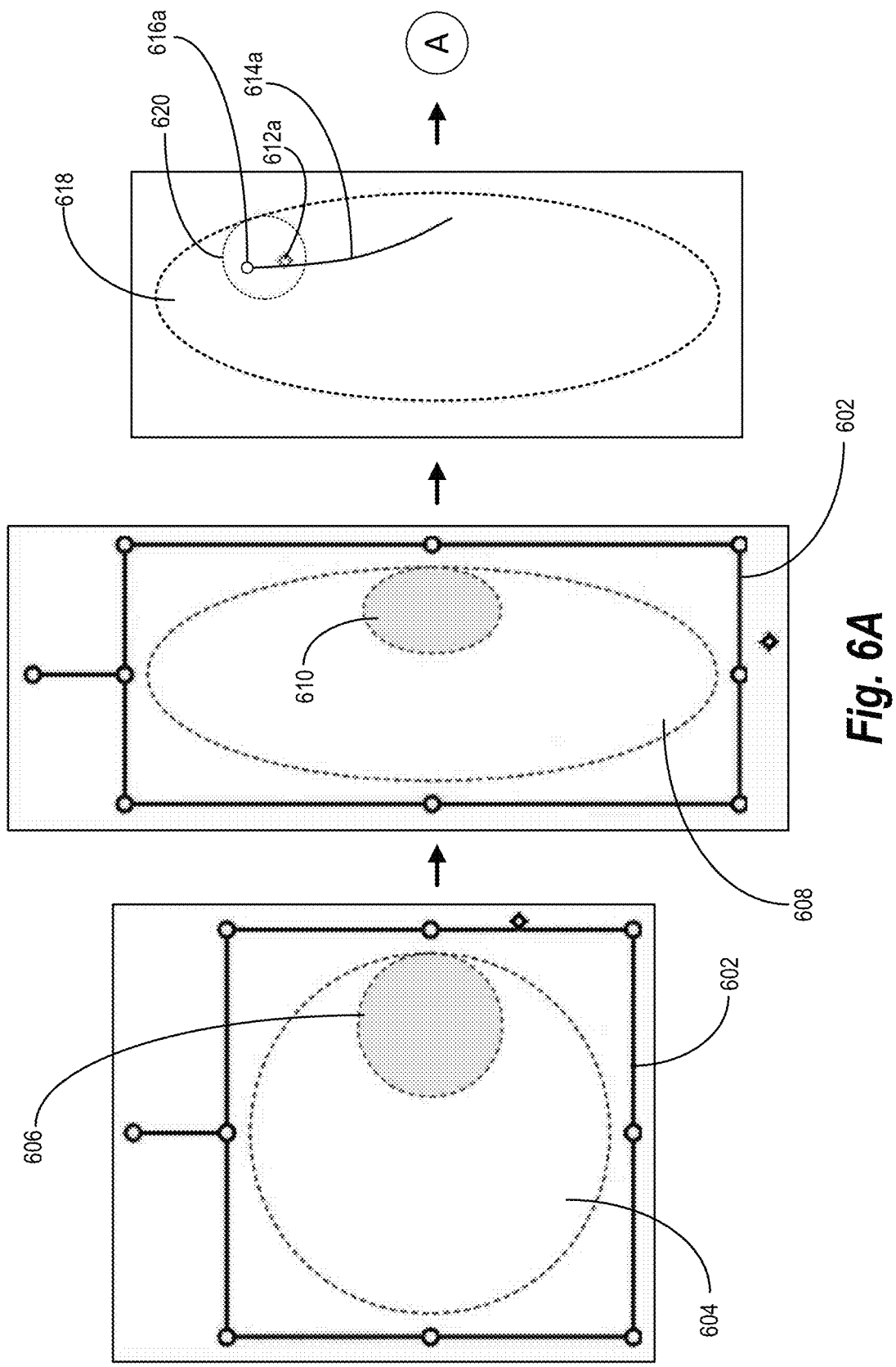
FIGS. 6A and 6B illustrate a digital geometric drawing system resizing a primary and secondary shape to generate a digital line drawing for a spirograph design in accordance with one or more implementations.
Figure 6B:
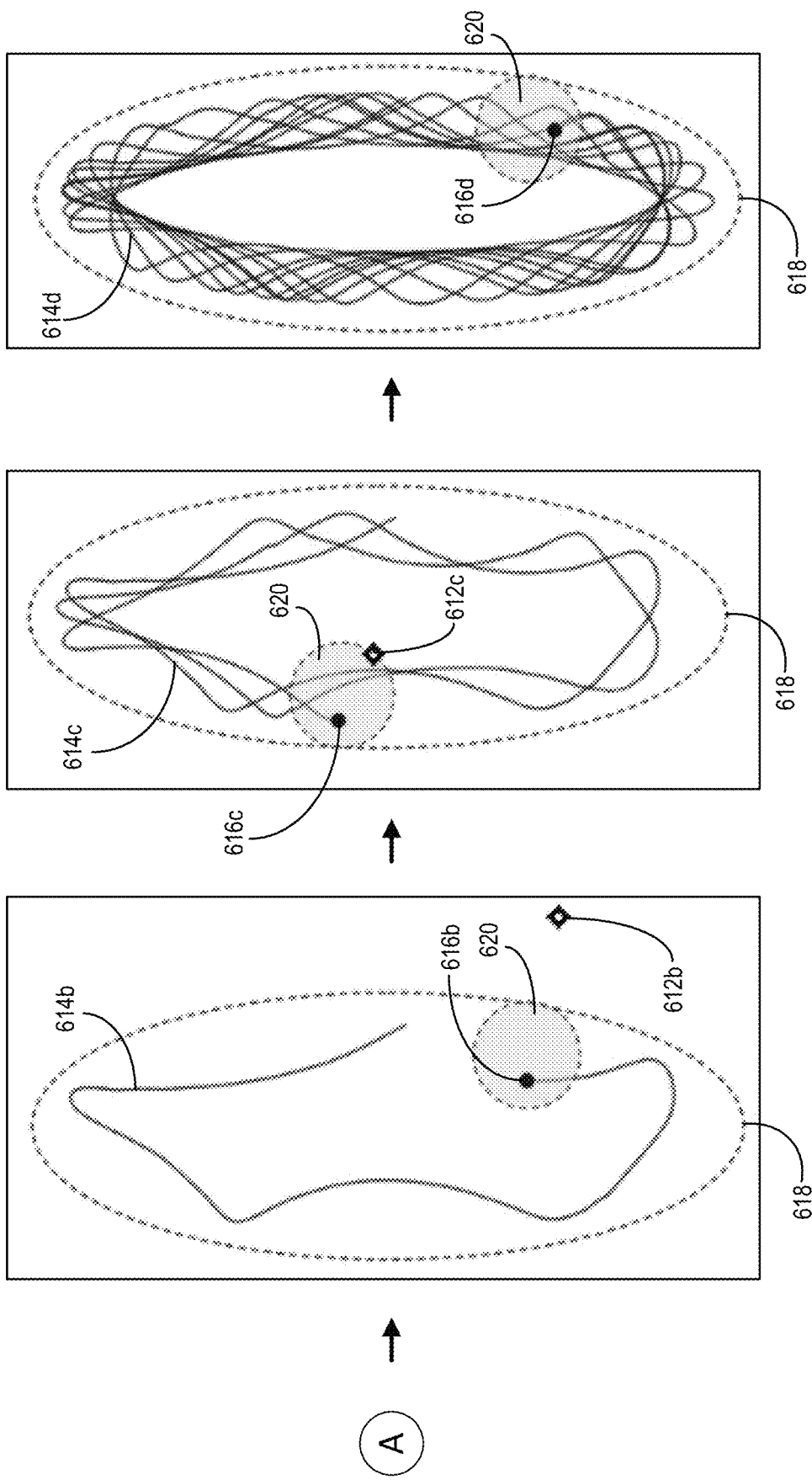

As mentioned above, in one or more embodiments, the digital geometric drawing system 106 utilizes various shapes and sizes for the primary and secondary shapes to generate line drawings for varying spirograph designs. For example, FIGS. 6A and 6B illustrate the digital geometric drawing system 106 resizing a primary and secondary shape to generate a digital line drawing for a spirograph design with a varied shape. As shown in FIG. 6A, the digital geometric drawing system 106 displays a primary shape 604 and a secondary shape 606 within a graphical user interface. Then, as shown in FIG. 6A, upon receiving a user interaction with the transformation selector 602, the digital geometric drawing system 106 resizes (and reshapes) the primary shape 604 to a primary shape 608 and resizes (and reshapes) the secondary shape 606 to the secondary shape 610. Indeed, as shown in FIG. 6A, upon resizing the primary and secondary shapes, the digital geometric drawing system 106 displays a final primary shape 618 and a final secondary shape 620.

Furthermore, as shown in FIG. 6A, the digital geometric drawing system 106 receives a user interaction 612a to move a contact point 616a. In response, as shown in FIG. 6A, the digital geometric drawing system 106 updates a position of the contact point 616a in relation to a rotation of the secondary shape 620 moving along a movement path corresponding to the primary shape 618 (to generate a digital line drawing 614a). Furthermore, as shown in the transition from FIG. 6A to 6B, the digital geometric drawing system 106 continues to update a position of the contact point (to the contact point 616b) in relation to a rotation of the secondary shape 620 moving along the movement path corresponding to the primary shape 618 (to generate the updated digital line drawing 614b) in response to an updated user interaction 612b. Furthermore, as also shown in FIG. 6B, the digital geometric drawing system 106 continues to update a position of the contact point (to the contact point 616c) in relation to a rotation of the secondary shape 620 moving along the movement path corresponding to the primary shape 618 (to generate the updated digital line drawing 614c) in response to an updated user interaction 612c. Indeed, as shown in FIG. 6B, the digital geometric drawing system 106 generates a digital line drawing 614d depicting a spirograph design with updates from continuous movement of the contact point 616d in relation to a rotation of the secondary shape 620 moving along the movement path corresponding to the primary shape 618.

Figure 7A:
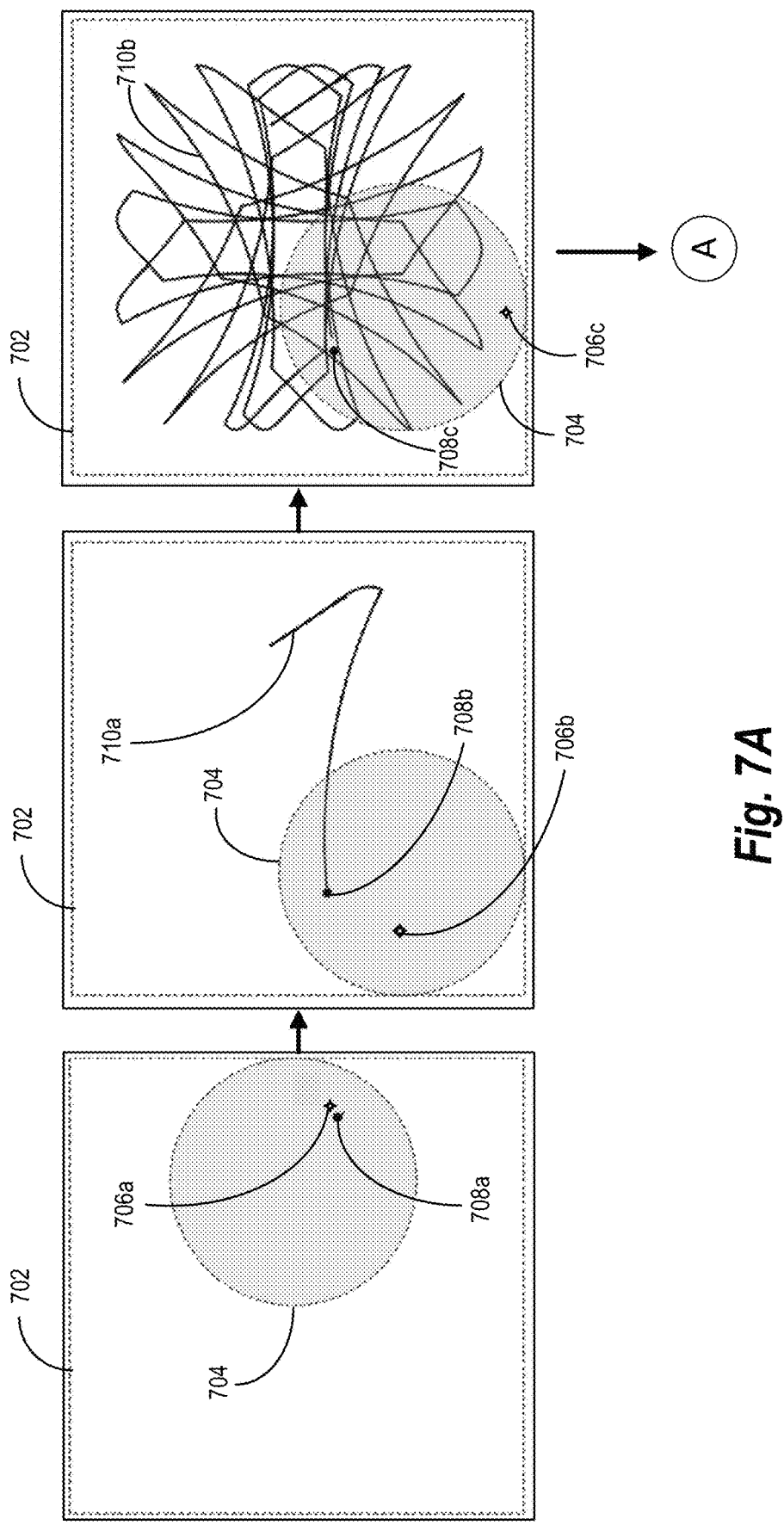
FIGS. 7A-7D illustrate a digital geometric drawing system utilizing a square shaped primary shape with a secondary shape to generate a line drawing representing a spirograph design in accordance with one or more implementations.

Furthermore, as mentioned above, the digital geometric drawing system 106 utilizes various selected shapes for the primary and secondary shapes to generate line drawings for varying spirograph designs. To illustrate, FIGS. 7A-7D illustrate the digital geometric drawing system 106 utilizing a square shaped primary shape with a secondary shape to generate a line drawing representing a spirograph design (in accordance with one or more embodiments herein). As shown in FIG. 7A, the digital geometric drawing system 106 receives a user interaction 706a within a secondary shape 704 to initiate a contact point 708a (with relation to a square primary shape 702).

Additionally, as shown in FIG. 7A, the digital geometric drawing system 106 receives a user interaction 706b to move the contact point 708a and, in turn, the digital geometric drawing system 106 updates a position of the contact point 708b in relation to a rotation of the secondary shape 704 moving along a movement path corresponding to the square primary shape 702 (to generate a digital line drawing 710a). Indeed, as shown in FIG. 7A, the digital geometric drawing system 106 continues to update a position of the contact point (to the contact point 708c) in relation to a rotation of the secondary shape 704 moving along the movement path corresponding to the square primary shape 702 (to generate the updated digital line drawing 710b) in response to an updated user interaction 706c. As further shown in the transition from FIG. 7A to 7B, the digital geometric drawing system 106 generates a digital line drawing 710c depicting a spirograph design (from continuous movement of the contact point 708c).

Figure 7B:
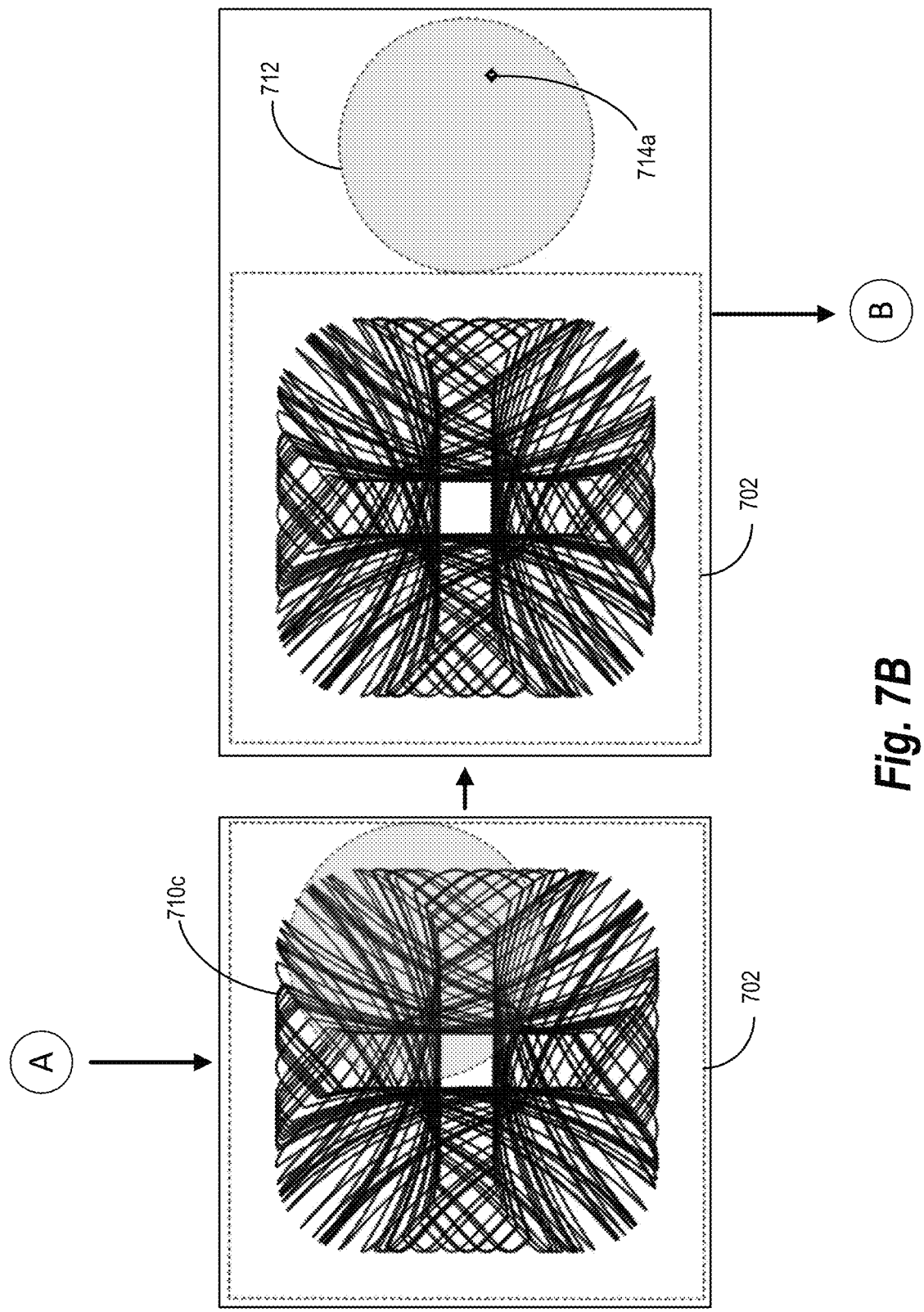
Figure 7C:
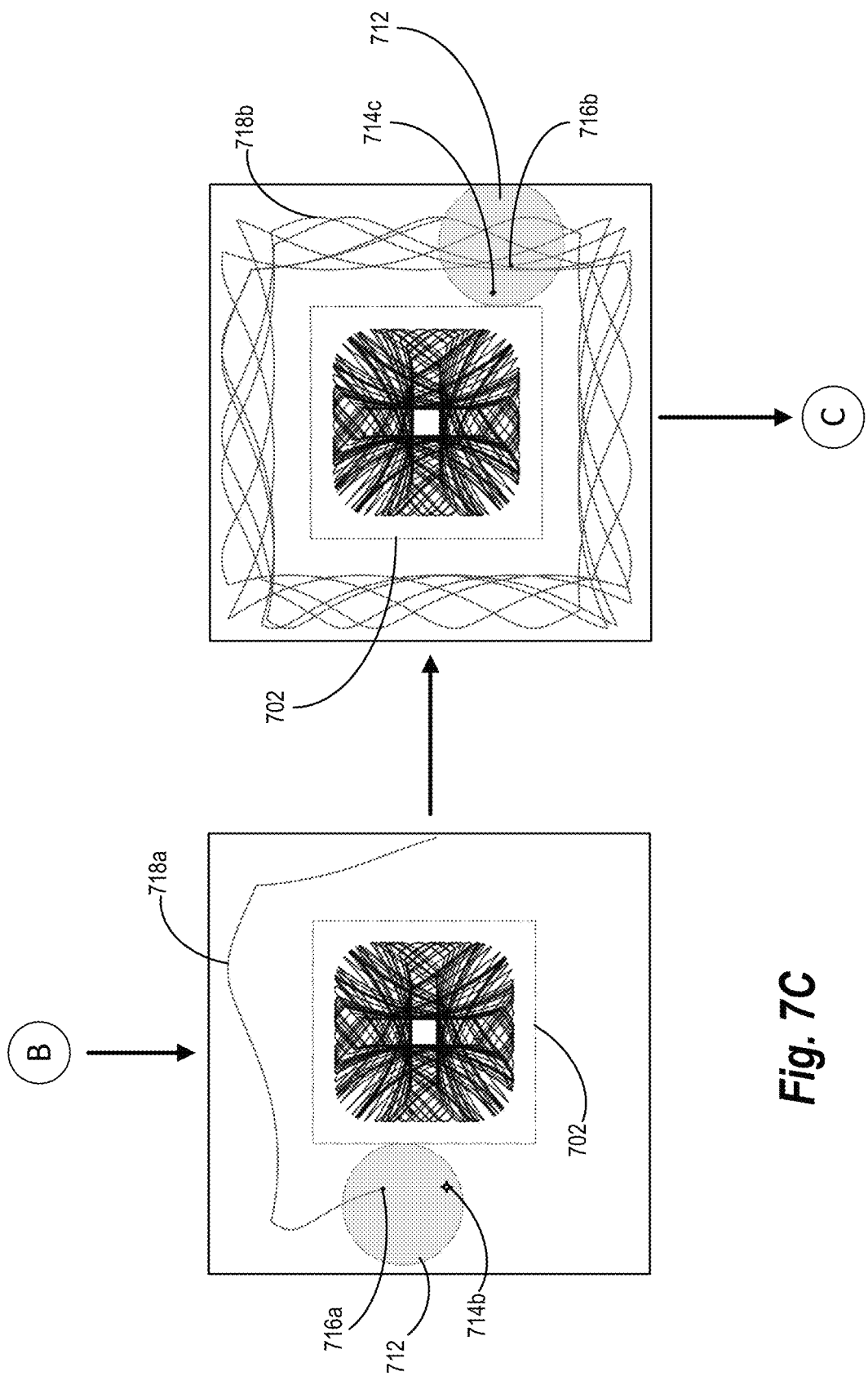
Figure 7D:
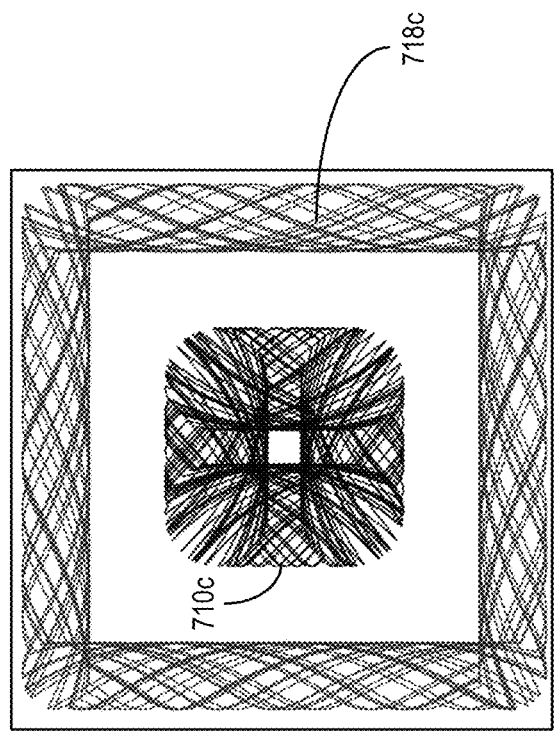
Figure 7D:

Furthermore, as shown in FIG. 7B, the digital geometric drawing system 106 receives a user interaction to select an additional secondary shape (on the outside of the square primary shape 702) and positions an additional secondary shape 712 on the outside of the square primary shape 702). Furthermore, as shown in FIG. 7B, the digital geometric drawing system 106 receives a user interaction 714a within the additional secondary shape 712 to initiate a contact point. Furthermore, as shown in the transition from FIG. 7B to FIG. 7C, the digital geometric drawing system 106 updates a position of the contact point (to a contact point 716a) in relation to a rotation of the additional secondary shape 712 moving along the movement path corresponding to the square primary shape 702 (to generate a digital line drawing 718a) in response to an updated user interaction 714b. Indeed, as also shown in FIG. 7C, the digital geometric drawing system 106 continues to update a position of the contact point (to a contact point 716b) in relation to a rotation of the additional secondary shape 712 moving along the movement path corresponding to the square primary shape 702 (to generate an updated digital line drawing 718b)

in response to an updated user interaction 714c. Indeed, as shown in the transition from FIG. 7C to 7D, the digital geometric drawing system 106 generates a digital line drawing 718c depicting an additional spirograph design (from continuous movement of the contact point 716b) in addition to the digital line drawing 710c depicting the first spirograph design.

Figure 8:
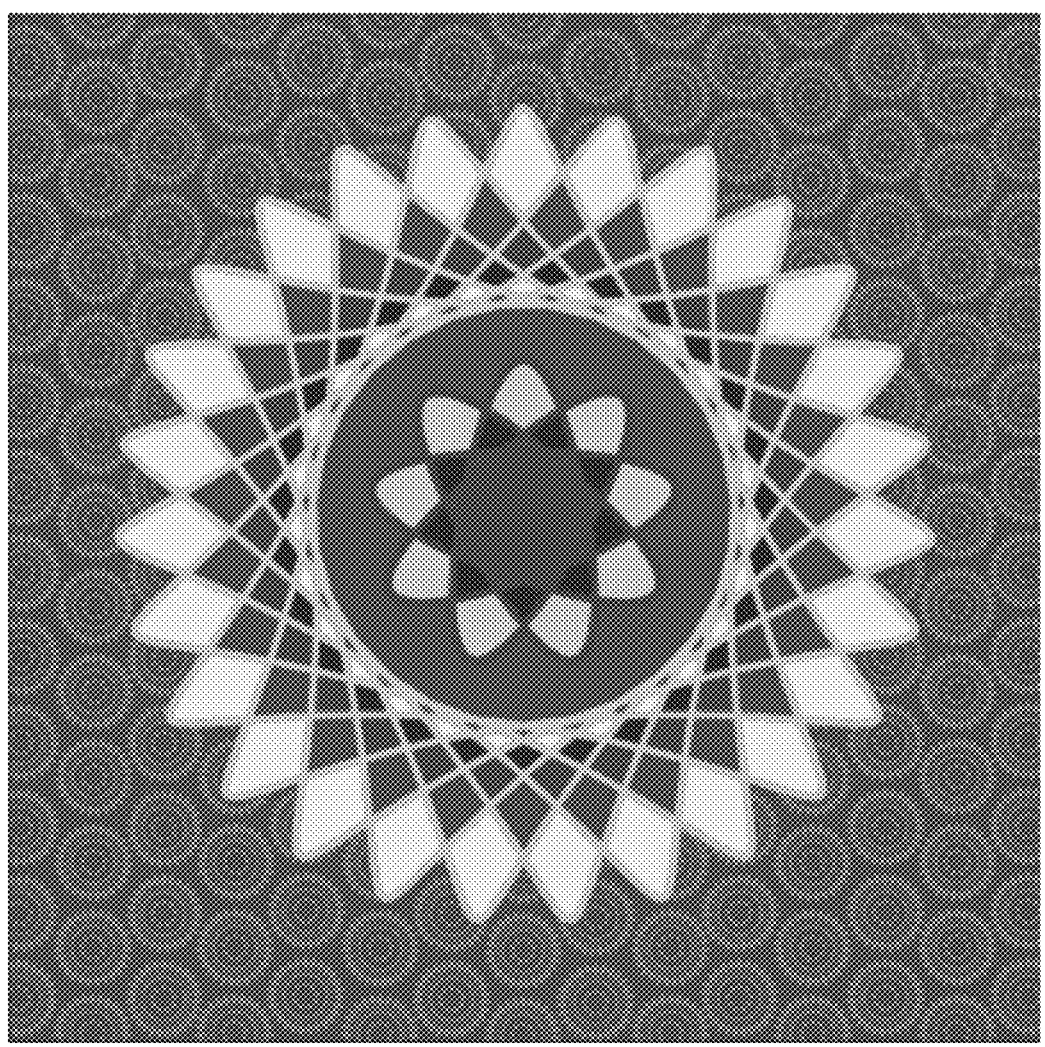
FIGS. 8-10 illustrate exemplary digital line drawings for spirographs generated by a digital geometric drawing system in accordance with one or more implementations.
Figure 9:
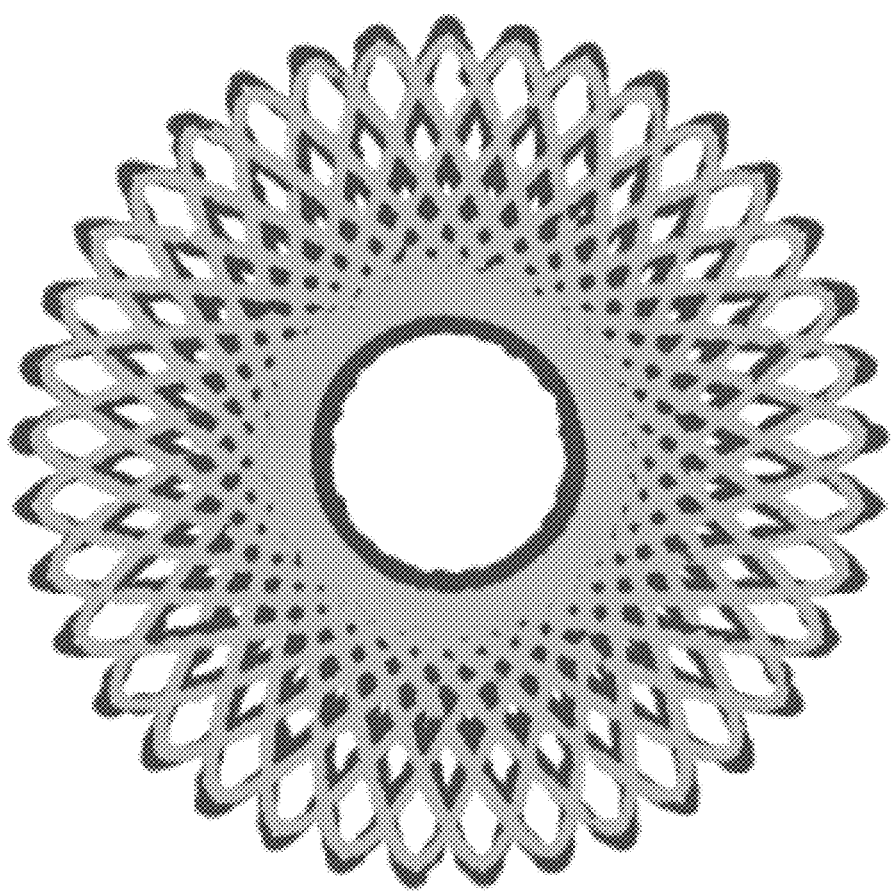
Figure 10:
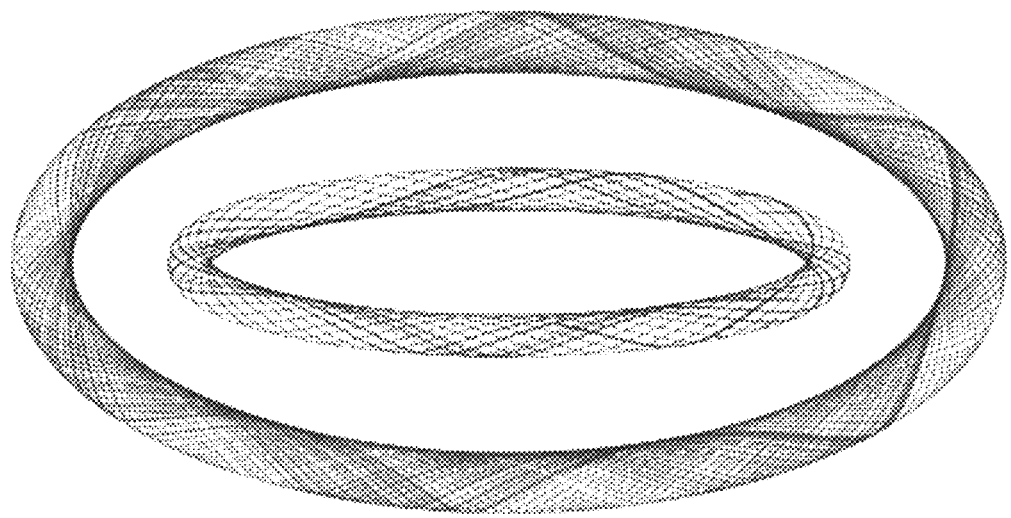

In one or more embodiments, the digital geometric drawing system 106 generates various numbers of spirograph designs from various segments digital line drawings. In addition, in one or more embodiments, the digital geometric drawing system 106 also generates various spirograph designs in various shapes and along various movement paths of various shapes (in accordance with one or more implementations herein). For instance, FIGS. 8, 9, and 10 illustrate the digital geometric drawing system 106 generating various digital line drawings (in accordance with one or more embodiments herein) to depict various spirograph designs having various combinations of shapes, drawing tool types, colors, sizes, and duplications.

Figure 11:
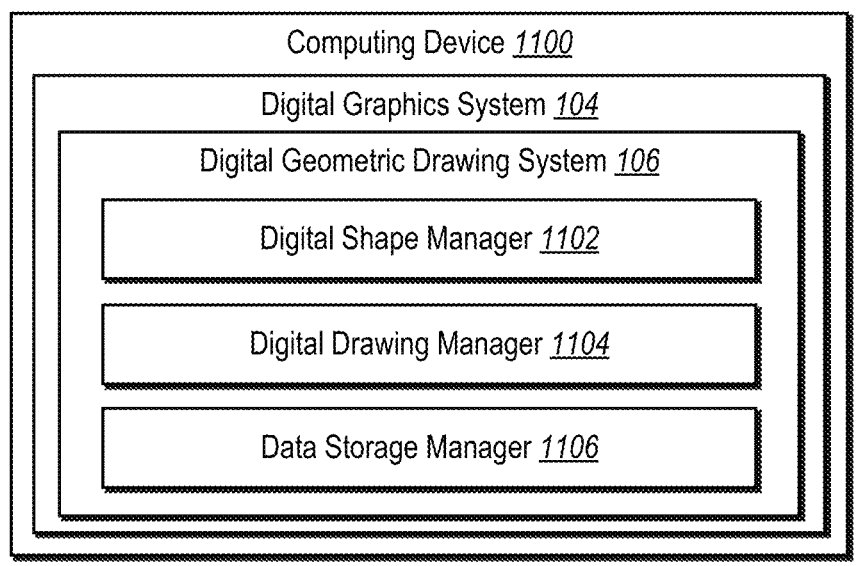
FIG. 11 illustrates a schematic diagram of a digital geometric drawing system in accordance with one or more implementations.

Turning now to FIG. 11, additional detail will be provided regarding components and capabilities of one or more embodiments of the digital geometric drawing system. In particular, FIG. 11 illustrates an example digital geometric drawing system 106 executed by a computing device 1100 (e.g., the server device(s) 102 and client device 110). As shown by the embodiment of FIG. 11, the computing device 1100 includes or hosts the digital graphics system 104 and the digital geometric drawing system 106. Furthermore, as shown in FIG. 11, the digital graphics system 104 includes a digital shape manager 1102, a digital drawing manager 1104, and data storage manger 1106.

As just mentioned, and as illustrated in the embodiment of FIG. 11, the digital geometric drawing system 106 includes the digital shape manager 1102. For example, the digital shape manager 1102 provides and/or generates various shapes (e.g., primary shapes and secondary shapes) for a digital drawing application as described above (e.g., in relation to FIGS. 2-7). Furthermore, the digital shape manager 1102 causes various transformations and/or movements for the computer graphic-based shapes in response to user interactions with the shapes as described above (e.g., in relation to FIGS. 2-7).

Moreover, as shown in FIG. 11, the digital geometric drawing system 106 includes the digital drawing manager 1104. In one or more embodiments, the digital drawing manager 1104 receives user interactions to move a contact point and projects positions of a contact point in relation to a rotation of a secondary shape along a movement path corresponding to a primary shape as described above (e.g., in relation to FIGS. 2-7). Indeed, in one or more implementations, the digital drawing manager 1104 utilizes projected positions of the moving contact point to generate a digital line drawing that represents a spirograph design as described above (e.g., in relation to FIGS. 2-10). Furthermore, in one or more cases, the digital drawing manager 1104 enables various modifications to digital line drawings that represent spirograph designs as described above (e.g., in relation to FIGS. 2-10).

As further shown in FIG. 11, the digital geometric drawing system 106 includes the data storage manger 1106. In some embodiments, the data storage manger 1106 maintains data to perform one or more functions of the digital geometric drawing system 106. For example, the data storage manger 1106 includes shapes, electronic drawing tool implementations, digital line drawings, coordinate points for various shapes and/or contact points, and/or digital drawings of spirographs.

Each of the components 1102-1106 of the computing device 1100 (e.g., the computing device 1100 implementing the digital geometric drawing system 106), as shown in FIG. 11, may be in communication with one another using any suitable technology. The components 1102-1106 of the computing device 1100 can comprise software, hardware, or both. For example, the components 1102-1106 can comprise one or more instructions stored on a computer-readable storage medium and executable by processor of one or more computing devices. When executed by the one or more processors, the computer-executable instructions of the digital geometric drawing system 106 (e.g., via the computing device 1100) can cause a client device and/or server device to perform the methods described herein. Alternatively, the components 1102-1106 and their corresponding elements can comprise hardware, such as a special purpose processing device to perform a certain function or group of functions. Additionally, the components 1102-1106 can comprise a combination of computer-executable instructions and hardware.

Furthermore, the components 1102-1106 of the digital geometric drawing system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1102-1106 may be implemented as a stand-alone application, such as a desktop or mobile application. Furthermore, the components 1102-1106 may be implemented as one or more web-based applications hosted on a remote server. The components 1102-1106 may also be implemented in a suite of mobile device applications or "apps." To illustrate, the components 1102-1106 may be implemented in an application, including but not limited to, ADOBE PHOTOSHOP, ADOBE PREMIERE, ADOBE LIGHTROOM, ADOBE ILLUSTRATOR, or ADOBE SUBSTANCE. "ADOBE," "ADOBE PHOTOSHOP," "ADOBE PREMIERE," "ADOBE LIGHTROOM," "ADOBE ILLUSTRATOR," "ADOBE FRESCO," or "ADOBE SUBSTANCE" are either registered trademarks or trademarks of Adobe Inc. in the United States and/or other countries.

Figure 12:
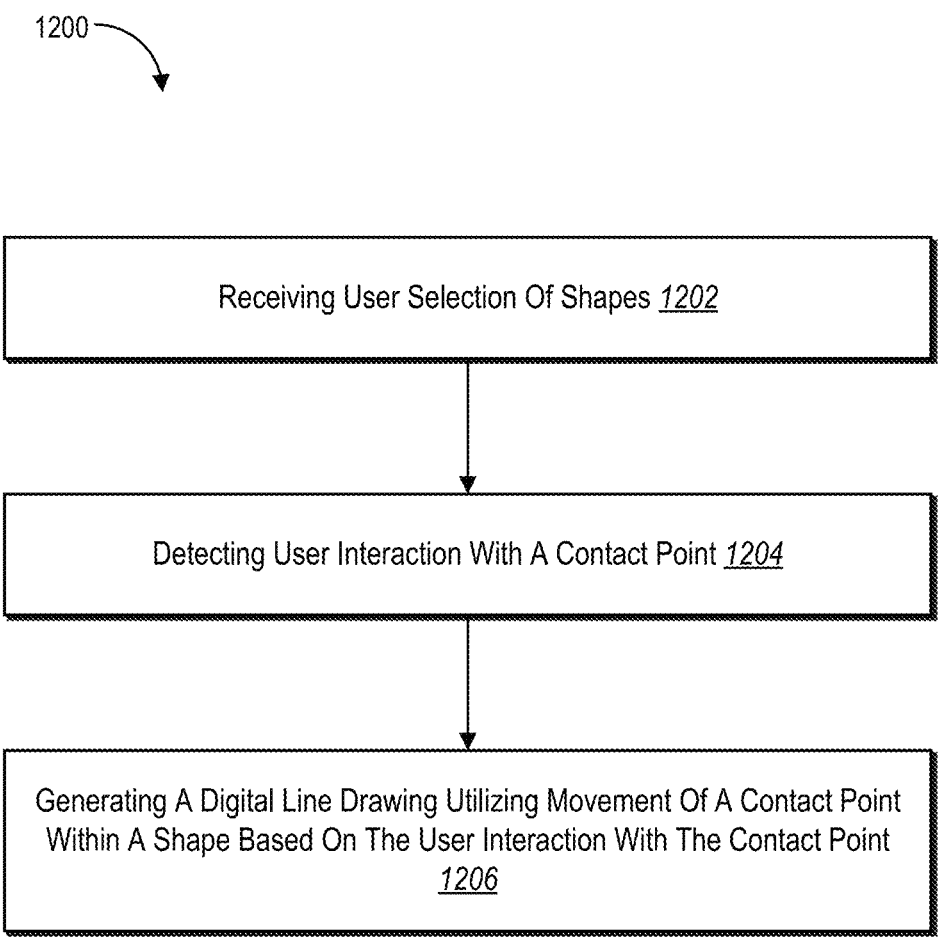
FIG. 12 illustrates a flowchart of a series of acts for utilizing a lightweight drawing application technique to simulate a drawing of a digital spirograph design in accordance with one or more implementations.

FIGS. 1-11, the corresponding text, and the examples provide a number of different methods, systems, devices, and non-transitory computer-readable media of the digital geometric drawing system 106. In addition to the foregoing, one or more embodiments can also be described in terms of flowcharts comprising acts for accomplishing a particular result, as shown in FIG. 12. The acts shown in FIG. 12 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 12. In some embodiments, a system can be configured to perform the acts of FIG. 12. Alternatively, the acts of FIG. 12 can be performed as part of a computer implemented method.

As mentioned above, FIG. 12 illustrates a flowchart of a series of acts 1200 for utilizing a lightweight drawing application technique to simulate a drawing of a digital spirograph design in accordance with one or more implementations. While FIG. 12 illustrates acts according to one embodiment, alternative embodiments may omit, add to, reorder, and/or modify any of the acts shown in FIG. 12.

As shown in FIG. 12, the series of acts 1200 include an act 1202 of receiving a user selection of shapes, an act 1204 of detecting a user interaction with a contact point, and an act 1206 of generating a digital line drawing utilizing movement of a contact point within a shape based on the user interaction with the contact point.

In particular, in one or more embodiments, the act 1202 includes receiving a user selection of a primary shape, the act 1204 includes detecting, within a graphical user interface, a user interaction with a contact point within a secondary shape to move the contact point from a first location to a second location, and the act 1206 includes generating, for display on the graphical user interface in response to the user interaction with the contact point, a digital line drawing from the first location to the second location utilizing a movement of the contact point in relation to a rotation of the secondary shape along the primary shape.

In some cases, the act 1202 includes receiving, within a graphical user interface, a user selection of a primary shape, the act 1204 includes detecting, within the graphical user interface, a user interaction with a contact point within a secondary shape to move the contact point from a first location to a second location, and the act 1206 includes generating, for display on the graphical user interface, a digital line drawing from the first location to the second location utilizing a movement of the contact point in relation to a rotation of a secondary curve of the secondary shape along a movement path corresponding to a primary curve of the primary shape based on the user interaction with the contact point.

In some instances, the act 1202 includes identifying a primary shape with a primary curve and a secondary shape with a secondary curve and determining a movement path for a center point of the secondary curve utilizing a primary curve scale from the primary curve and a secondary curve scale from the secondary curve, the act 1204 includes detecting, within a graphical user interface, a user interaction with a contact point within the secondary shape to move the contact point from a first location to a second location, and the act 1206 includes, in response to the user interaction with the contact point, generating, for display on the graphical user interface, a digital line drawing from the first location to the second location utilizing updated positions of the contact point based on an updated position of a center point of the secondary curve and a secondary curve rotation angle in relation to the movement path (e.g., the movement path determined from a movement distance of the secondary curve on the movement path).

In addition, in one or more embodiments, the series of acts 1200 include generating the digital line drawing from the first location to the second location by displaying an animation of the digital line drawing following a path of the movement of the contact point from the first location to the second location.

Furthermore, in some cases, the series of acts 1200 include determining a movement path for a center point of a secondary curve of the secondary shape utilizing a primary curve scale from a primary curve of the primary shape, a secondary curve scale from the secondary curve, and/or a mode selector indicating that the secondary curve is inside of the primary curve or the secondary curve is outside of the primary curve. Furthermore, the series of acts 1200 include generating the digital line drawing utilizing the movement of the contact point in relation to the rotation of the secondary curve of the secondary shape along the movement path corresponding to the primary curve of the primary shape. In some cases, a primary shape includes a circle, an oval, a square, a rectangle, or an ellipse. Additionally, in one or more embodiments, a primary curve includes a scale value, a rotation value, and a center position. Furthermore, in one or more embodiments, the series of acts 1200 include receiving, within the graphical user interface, a user selection of a location of the secondary curve inside of the primary curve or outside of the primary curve.

In one or more implementations, the series of acts 1200 include determining a movement distance of a center point of the secondary shape along the movement path corresponding to the primary shape during the user interaction with the contact point. Furthermore, in some instances, the series of acts 1200 include determining an angle from a primary curve center point of the primary shape between a first position of a center point of the secondary shape and a second position of the center point of the secondary shape based on the movement of the center point of the secondary shape from the first location to the second location. In addition, in one or more embodiments, the series of acts 1200 include determining a secondary curve rotation angle utilizing the movement distance and the angle from the primary curve center point. In some cases, the series of acts 1200 include determining an angle from a primary curve center point of the primary curve between a first position of a center point of the secondary curve and a second position of the center point of the secondary curve based on the updated position of the center point of the secondary curve from the first location to the second location and determining the secondary curve rotation angle utilizing a movement distance of the secondary curve on the movement path and the angle from the primary curve center point.

Moreover, in some cases, the series of acts 1200 include determining an offset coordinate distance between the contact point and the center point of the secondary shape and updating a coordinate position of the contact point by adding a combination of the offset coordinate distance modified by the secondary curve rotation angle to a center point coordinate position of the center point of the secondary shape. In some instances, the series of acts 1200 include determining an offset coordinate distance between the contact point and the center point of the secondary curve and determining the updated positions of the contact point by adding a combination of the offset coordinate distance modified by the secondary curve rotation angle to a center point coordinate position of the center point of the secondary curve.

Additionally, in one or more cases, the series of acts 1200 include generating, for display on the graphical user interface, the digital line drawing from the first location to the second location utilizing the updated coordinate position of the contact point.

In one or more implementations, the series of acts 1200 include receiving, within the graphical user interface, a user selection of a primary shape size and a secondary shape size. Furthermore, in some instances, the series of acts 1200 include receiving, within the graphical user interface, a user selection of a draw tool for the digital line drawing.

In some cases, the series of acts 1200 include a digital line drawing that represents a spirograph design and transforming, within the graphical user interface, the spirograph design, moving, within the graphical user interface, the spirograph design, and/or modifying, within the graphical user interface, an appearance of the spirograph design.

In some embodiments, the series of acts 1200 include retaining a contact point within the secondary shape upon receiving a user deselection of the contact point within the graphical user interface.

Furthermore, in one or more embodiments, the series of acts 1200 include determining the movement path for the center point of the secondary curve utilizing a mode selector indicating that the secondary curve is inside the primary curve or the secondary curve is outside the primary curve.

In addition, in one or more embodiments, the series of acts 1200 include determining the movement distance of the center point of the secondary curve along the movement path based on a traversal of distance between multiple points from multiple parameter updates during the user interaction with the contact point.

In one or more embodiments, the series of acts 1200 include receiving, within the graphical user interface, a user selection of an additional primary shape comprising an additional primary curve and generating, for display on the graphical user interface, an additional digital line drawing utilizing a movement of an additional contact point based on an additional secondary curve and the additional primary curve from a user interaction with the additional contact point.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium.

Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 13:
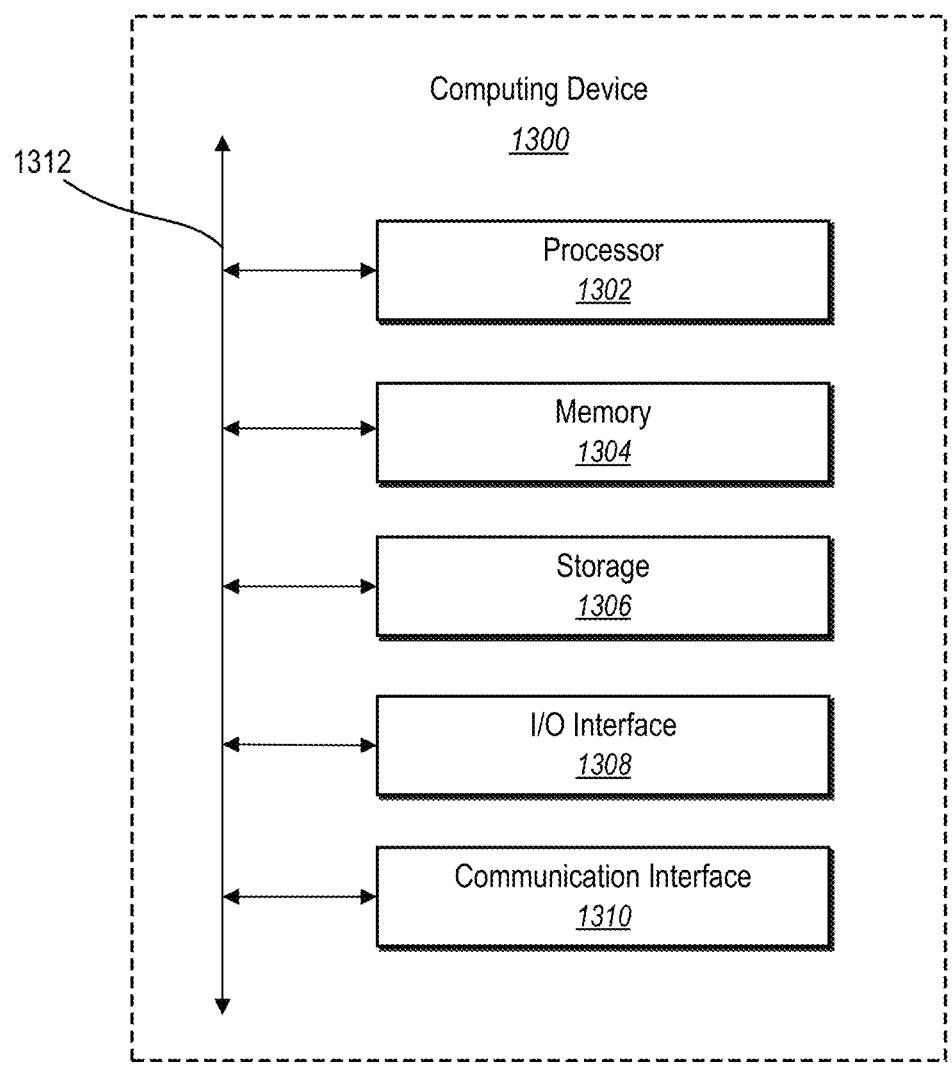
FIG. 13 illustrates a block diagram of an example computing device in accordance with one or more implementations.

FIG. 13 illustrates a block diagram of an example computing device 1300 that may be configured to perform one or more of the processes described above. One will appreciate that one or more computing devices, such as the computing device 1300 may represent the computing devices described above (e.g., the server device(s) 102 and the client device 110). In one or more implementations, the computing device 1300 may be a mobile device (e.g., a mobile telephone, a smartphone, a PDA, a tablet, a tablet with an electronic tablet pen or stylus, a laptop, a camera, a tracker, a watch, a wearable device, etc.). In some implementations, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other implementations. Furthermore, in certain implementations, the computing device 1300 includes fewer components than those shown in FIG. 13. Components of the computing device 1300 shown in FIG. 13 will now be described in additional detail.

In particular implementations, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 can include a non-transitory storage medium described above. The storage device 1306 may include a hard disk drive ("HDD"), flash memory, a Universal Serial Bus ("USB") drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller ("NIC") or network adapter for communicating with an Ethernet or other wire-based network or a wireless NIC ("WNIC") or wireless adapter for communicating with a wireless network, such as a WI-FI. The computing device 1310 can further include a bus 1312. The bus 1312 can include hardware, software, or both that connects components of the computing device 1300 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
   receiving a user selection of a primary shape;
   detecting, within a graphical user interface, a user interaction with a contact point within a secondary shape to move the contact point from a first location to a second location; and
   determining a movement distance of a center point of the secondary shape along a movement path of the center point in relation to the primary shape based on a traversal of distance between multiple points from multiple parameter updates during the user interaction with the contact point; and
   in response to the user interaction with the contact point, generating, for display on the graphical user interface, a digital line drawing from the first location to the second location utilizing a movement of the contact point in relation to a rotation of the secondary shape along the movement path corresponding to the primary shape based on the movement distance of the center point of the secondary shape.

2. The method of claim 1, further comprising generating the digital line drawing from the first location to the second location by displaying an animation of the digital line drawing following a path of the movement of the contact point from the first location to the second location.

3. The method of claim 1, further comprising:
   determining the movement path for the center point of a secondary curve of the secondary shape utilizing a primary curve scale from a primary curve of the primary shape, a secondary curve scale from the secondary curve, or a mode selector indicating that the secondary curve is inside of the primary curve or the secondary curve is outside of the primary curve.

4. The method of claim 1, further comprising:
   determining an angle from a primary curve center point of the primary shape between a first position of the center point of the secondary shape and a second position of the center point of the secondary shape based on the movement of the center point of the secondary shape from the first location to the second location; and
   determining a secondary curve rotation angle utilizing the movement distance and the angle from the primary curve center point.

5. The method of claim 4, further comprising:
   determining an offset coordinate distance between the contact point and the center point of the secondary shape; and
   updating a coordinate position of the contact point by adding a combination of the offset coordinate distance modified by the secondary curve rotation angle to a center point coordinate position of the center point of the secondary shape.

6. The method of claim 5, further comprising generating, for display on the graphical user interface, the digital line drawing from the first location to the second location utilizing the updated coordinate position of the contact point.

7. The method of claim 1, further comprising receiving, within the graphical user interface, a user selection of a primary shape size and a secondary shape size.

8. The method of claim 1, further comprising receiving, within the graphical user interface, a user selection of a draw tool for the digital line drawing.

9. The method of claim 1, wherein the digital line drawing represents a spirograph design and further comprising:
   transforming, within the graphical user interface, the spirograph design;
   moving, within the graphical user interface, the spirograph design; or
   modifying, within the graphical user interface, an appearance of the spirograph design.

10. The method of claim 1, further comprising retaining the contact point within the secondary shape upon receiving a user deselection of the contact point within the graphical user interface.

11. A system comprising:
    a memory component; and
    a processing device coupled to the memory component, the processing device to perform operations comprising:
       determining a movement path for a center point of a secondary curve of a secondary shape utilizing a primary curve scale from a primary curve of a primary shape and a secondary curve scale from the secondary curve;
       detecting, within a graphical user interface, a user interaction with a contact point within the secondary shape to move the contact point from a first location to a second location;
       determining a movement distance of the center point of the secondary curve along the movement path based on a traversal of distance between multiple points from multiple parameter updates during the user interaction with the contact point; and
       in response to the user interaction with the contact point, generating, for display on the graphical user interface, a digital line drawing from the first location to the second location utilizing updated positions of the contact point based on an updated position of the center point of the secondary curve, the movement distance of the center point of the secondary curve, and a secondary curve rotation angle in relation to the movement path.

12. The system of claim 11, wherein the operations further comprise determining the movement path for the center point of the secondary curve utilizing a mode selector indicating that the secondary curve is inside the primary curve or the secondary curve is outside the primary curve.

13. The system of claim 11, wherein the operations further comprise generating the digital line drawing from the first location to the second location by displaying an animation of the digital line drawing following a path of a movement of the contact point from the first location to the second location.

14. The system of claim 11, wherein the operations further comprise determining the secondary curve rotation angle by:
    determining an angle from a primary curve center point of the primary curve between a first position of the center point of the secondary curve and a second position of the center point of the secondary curve based on the updated position of the center point of the secondary curve from the first location to the second location; and
    determining the secondary curve rotation angle utilizing the movement distance of the center point of the secondary curve on the movement path and the angle from the primary curve center point.

15. The system of claim 11, wherein the operations further comprise:
    determining an offset coordinate distance between the contact point and the center point of the secondary curve; and determining the updated positions of the contact point by adding a combination of the offset coordinate distance modified by the secondary curve rotation angle to a center point coordinate position of the center point of the secondary curve.

16. A non-transitory computer-readable medium storing instructions that, when executed by at least one processor, cause the at least one processor to perform operations comprising:

receiving a user selection of a primary shape;

detecting, within a graphical user interface, a user interaction with a contact point within a secondary shape to move the contact point from a first location to a second location;

determining a movement distance of a center point of the secondary shape along a movement path of the center point in relation to the primary shape based on a traversal of distance between multiple points from multiple parameter updates during the user interaction with the contact point; and generating, for display on the graphical user interface in response to the user interaction with the contact point, a digital line drawing from the first location to the second location utilizing a movement of the contact point in relation to a rotation of the secondary shape along the movement path corresponding to the primary shape based on the movement distance of the center point of the secondary shape.

17. The non-transitory computer-readable medium of claim 16, wherein:

the primary shape comprises a circle, an oval, a square, a rectangle, or an ellipse.

18. The non-transitory computer-readable medium of claim 16, wherein the operations further comprise determining the movement path for the center point of the secondary shape utilizing a primary curve scale from a primary curve of the primary shape and a secondary curve scale from a secondary curve of the secondary shape, wherein the primary curve comprises at least one of a scale value, a rotation value, or a center position.

19. The non-transitory computer-readable medium of claim 16, wherein the operations further comprise:

receiving, within the graphical user interface, a user selection of an additional primary shape comprising an additional primary curve; and generating, for display on the graphical user interface, an additional digital line drawing utilizing a movement of an additional contact point based on an additional secondary curve and the additional primary curve from a user interaction with the additional contact point.

20. The non-transitory computer-readable medium of claim 16, wherein the operations further comprise receiving, within the graphical user interface, a user selection of a location of the secondary shape inside of the primary shape or outside of the primary shape.

* * * * *